United States Patent
Shao et al.

(10) Patent No.: US 11,877,034 B2
(45) Date of Patent: Jan. 16, 2024

(54) DISPLAY APPARATUS AND CHANNEL CONTROL METHOD

(71) Applicant: Hisense Visual Technology Co., Ltd., Shandong (CN)

(72) Inventors: Xiaoming Shao, Shandong (CN); Peng Liu, Shandong (CN); Xiangtai Xu, Shandong (CN); Hongxun Huang, Shandong (CN); Guili Jia, Shandong (CN); Xuelei Wang, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 17/679,847

(22) Filed: Feb. 24, 2022

(65) Prior Publication Data

US 2022/0182726 A1   Jun. 9, 2022

Related U.S. Application Data

(63) Continuation of application No. PCT/CN2020/092096, filed on May 25, 2020.

(30) Foreign Application Priority Data

Dec. 3, 2019 (CN) .......................... 201911221796.2
Jan. 21, 2020 (CN) .......................... 202010071414.9
Mar. 10, 2020 (CN) .......................... 202010162735.X

(51) Int. Cl.
*H04N 21/482* (2011.01)
*H04N 21/422* (2011.01)
*H04N 21/438* (2011.01)

(52) U.S. Cl.
CPC ... *H04N 21/4821* (2013.01); *H04N 21/42204* (2013.01); *H04N 21/42216* (2013.01); *H04N 21/4383* (2013.01)

(58) Field of Classification Search
CPC .. H04N 21/485; H04N 21/4882; H04N 5/445; H04N 21/41265; H04N 21/42204; H04N 5/50
See application file for complete search history.

(56) References Cited

U.S. PATENT DOCUMENTS

| | | | | |
|---|---|---|---|---|
| 3,646,544 A | * | 2/1972 | Yamaguchi | G06F 3/1407 377/40 |
| 3,946,319 A | * | 3/1976 | Ma | H03J 5/0245 455/184.1 |
| 6,115,080 A | * | 9/2000 | Reitmeier | H04N 5/45 348/565 |
| 6,424,285 B1 | * | 7/2002 | Perdue | G08C 23/04 398/106 |

(Continued)

FOREIGN PATENT DOCUMENTS

| CN | 1977457 A | 6/2007 |
|---|---|---|
| CN | 201007858 Y | 1/2008 |

(Continued)

OTHER PUBLICATIONS

International Search Report, English Translation, dated Jul. 16, 2020, from PCT/CN2020/092096 filed May 25, 2020.

(Continued)

*Primary Examiner* — Jason Salce
(74) *Attorney, Agent, or Firm* — Workman Nydegger

(57) ABSTRACT

Disclosed are a display apparatus and a channel control method. The channel control method includes: upon receiving channel number information that constructs a channel number in a display apparatus from a control device, obtaining a second channel number according to an instruction for indicating the channel number information each time; determining whether a length of the second channel number is equal to the maximum length of a channel number of a channel list in the display apparatus; and in response to the length of the second channel number being equal to the maximum length of the channel list, directly switching to program content corresponding to the second channel number.

16 Claims, 15 Drawing Sheets

(56) References Cited

U.S. PATENT DOCUMENTS

| | | | | |
|---|---|---|---|---|
| 10,152,989 B1* | 12/2018 | Brown | ................ | H04N 21/251 |
| 2007/0233770 A1* | 10/2007 | Querre | ................ | H03J 1/0025 |
| | | | | 708/491 |
| 2008/0094514 A1* | 4/2008 | Ghislini | ............ | H04N 21/4312 |
| | | | | 348/E5.103 |
| 2008/0229359 A1 | 9/2008 | Robinson | | |
| 2009/0147140 A1* | 6/2009 | Kim | ................... | H04N 21/4383 |
| | | | | 348/565 |
| 2010/0103125 A1 | 4/2010 | Kim et al. | | |
| 2016/0057376 A1* | 2/2016 | Kim | ................... | H04N 21/4383 |
| | | | | 348/731 |

FOREIGN PATENT DOCUMENTS

| | | | |
|---|---|---|---|
| CN | 101132475 A | 2/2008 | |
| CN | 101257596 A | 9/2008 | |
| CN | 101742148 A | 6/2010 | |
| CN | 102457685 A | 5/2012 | |
| CN | 102547464 A | 7/2012 | |
| CN | 108924620 A | 11/2018 | |
| EP | 2169950 A2 | 3/2010 | |
| JP | 2008078998 A | 4/2008 | |

OTHER PUBLICATIONS

European extended Search Report, dated Mar. 15, 2023, from European pat. app. No. 20728901.8.

European Standard: "Digital Video Broadcasting (DVB); Specification for Service Information (SI) in DVB systems", May 1, 2014, pp. 2014-2015, Retrieved from Internet: URL:http://www.etsi.org/deliver/etsi_en/300400_300499/300468/01.14.01_60/en_30468v0114019.pdf.

* cited by examiner

DISPLAY APPARATUS AND CHANNEL CONTROL METHOD

CROSS REFERENCE TO RELATED APPLICATIONS

The disclosure is a continuation application of International Application No. PCT/CN2020/092096 filed on May 25, 2020, which claims the priorities of Chinese patent application No. 201911221796.2, filed on Dec. 3, 2019, Chinese patent application No. 202010071414.9, filed on Jan. 21, 2020, Chinese patent application No. 202010162735.X, filed on Mar. 10, 2020, the entire contents of which are incorporated herein by reference.

FIELD

The disclosure relates to the display technology, in particular to a display apparatus and a channel control method.

BACKGROUND

One of the most basic functions of an intelligent television is to switch a channel and locate the channel by inputting a channel number. For example, the intelligent television switches the channel under Live TV through the channel number, and performs channel location on an electronic program guide (EPG) user interface and a channel list user interface according to the channel number.

When a user uses an existing intelligent television, after inputting the channel number through a remote control, the user needs to click a confirm key or wait for a period of time, and then the intelligent television performs channel switch or channel positioning.

However, if the channel number input by the user exceeds a maximum length of a channel number in a current type of channel list, user input is regarded as invalid input, and the intelligent television does not respond as well, thereby influencing user's experience.

SUMMARY

An embodiment of the disclosure provides a display apparatus, including: a display; a user input interface, configured to receive an instruction from a user; and a controller, configured to perform: while a program content of a first channel in a first channel list is played on the display, in response to a channel number input from the user, displaying the channel number on the display in real time, and when it is determined that a length of a current channel number input from the user is equal to a maximum length of the channel number in the first channel list, switching the program content of the first channel into a program content of a second channel corresponding to the channel number input from the user.

An embodiment of the disclosure provides a display apparatus, including: a display, configured to display an electronic program guide (EPG) user interface, where the EPG user interface includes a two-dimensional program menu including one or more channels and one or more program play times, and includes a selector configured to indicate that a channel or a program is selected; a user input interface, configured to receive an instruction from a user; and a controller, configured to perform: while the EPG user interface displays a program menu corresponding to channels in a first channel list, in response to a channel number input from a user, displaying the channel number on the display in real time; and when it is determined that a length of a current channel number input from the user is equal to a maximum length of the channel number corresponding to the channels in the first channel list, updating the program menu displayed in the EPG user interface, and controlling the selector to select a first channel corresponding to the current channel number, or a program in the first channel corresponding to the current channel number; where the channel number input from the user includes one or more digits input one-by-one via the remote control.

An embodiment of the disclosure provides a display apparatus, including: a display, configured to display a channel list user interface, where the channel list user interface includes a plurality of channels, and includes a selector configured to indicate that a channel is selected; a user input interface, configured to receive an instruction from a user; and a controller, configured to perform: while the channel list user interface presents channels in a first channel list, in response to a channel number input from a user, displaying the channel number on the display in real time; and when it is determined that a length of a current channel number input from the user is equal to a maximum length of the channel number corresponding to the channels in the first channel list, updating the channels displayed in the channel list user interface, and controlling the selector to select a first channel corresponding to the current channel number; where the channel number input from the user includes one or more digits input one-by-one via the remote control.

An embodiment of the disclosure provides a channel control method for a display apparatus, including: while a display of the display apparatus plays a program content of a first channel in a first channel list, in response to a channel number input from a user, displaying the channel number on the display in real time; and when it is determined that a length of a current channel number input from the user is equal to a maximum length of the channel number corresponding to channels in the first channel list, switching the program content of the first channel to a program content of a second channel corresponding to the current channel number; where the channel number input from the user includes one or more digits input one-by-one via the remote control.

An embodiment of the disclosure provides a channel control method for a display apparatus, including: while an EPG user interface presented on the display apparatus displays a program menu corresponding to channels in a first channel list, in response to a channel number input from a user, displaying the channel number on a display of the display apparatus in real time, where the EPG user interface includes a two-dimensional program menu including one or more channels and one or more program play time, and includes a selector configured to indicate that a channel or a program is selected; and when it is determined that a length of a current channel number input from the user is equal to a maximum length of the channel number corresponding to the channels in the first channel list, updating the program menu displayed in the EPG user interface, and controlling the selector to select a first channel corresponding to the current channel number, or a program in the first channel corresponding to the current channel number; where the channel number input from the user includes one or more digits input one-by-one via the remote control.

An embodiment of the disclosure provides a channel control method for a display apparatus, including: while a channel list user interface presents channels in a first channel list, in response to a channel number input from a user, displaying the channel number on a display of the display apparatus in real time; and when it is determined that a length of a current channel number input from the user is equal to a maximum length of the channel number corresponding to the channels in the first channel list, updating the channels displayed in the channel list user interface, and controlling a selector to select a first channel corresponding to the current channel number; where the channel number input from the user includes one or more digits input one-by-one via the remote control.

DETAILED DESCRIPTION OF THE EMBODIMENTS

In order to make the objective, implementations and advantages of the embodiments of the disclosure more clear, the implementations in the embodiments of the disclosure will be described clearly and completely with reference to the drawings in the embodiments of the disclosure. Obviously, the described embodiments are part of the embodiments of the disclosure, but not all the embodiments. Based on the embodiments in the disclosure, all other embodiments obtained by those ordinarily skilled in the art without inventive efforts fall within the protection scope of the disclosure.

Figure 1A:
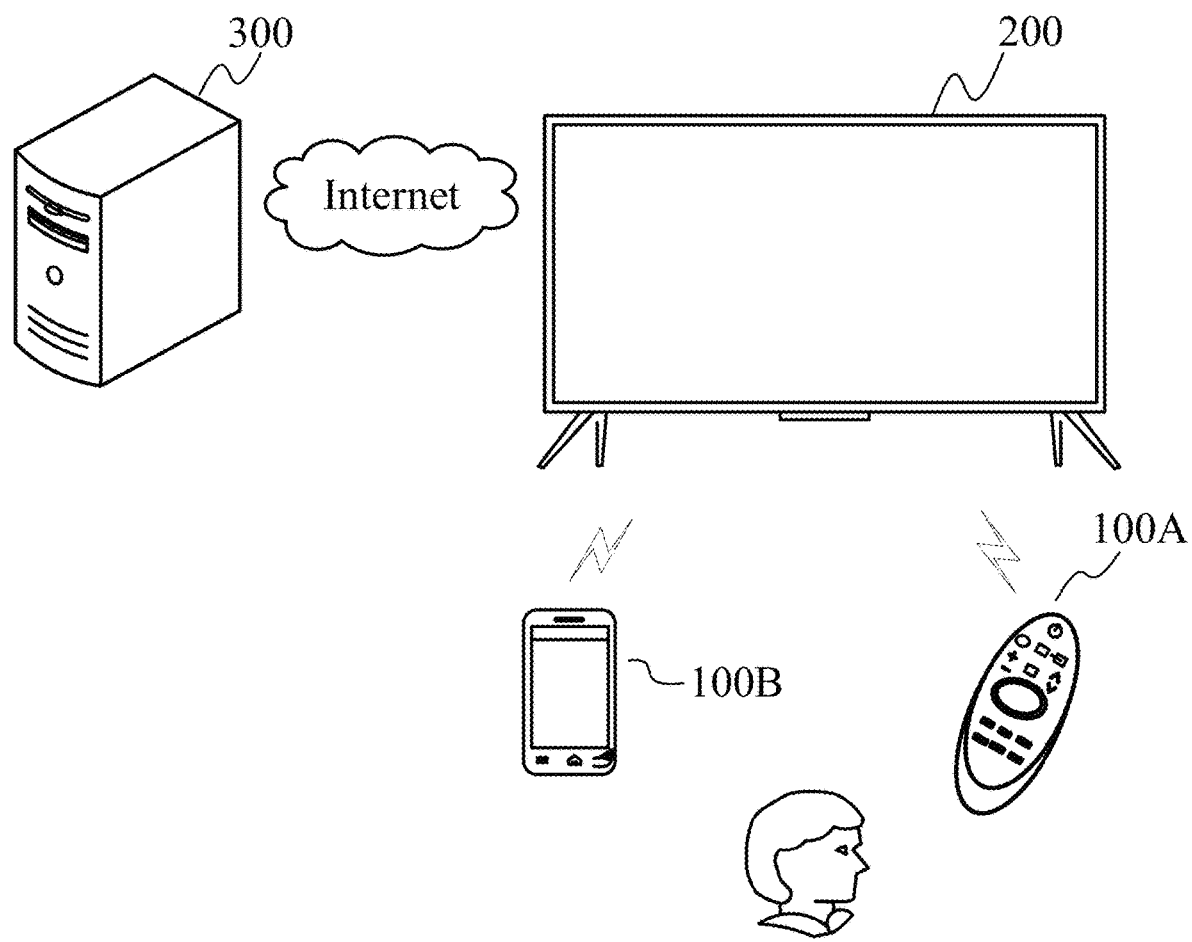
FIG. 1A illustrates a schematic diagram of an operating scenario between a display apparatus and a control device in an embodiment of the disclosure.

FIG. 1A illustrates a schematic diagram of an operating scene between a display apparatus and a control device. As shown in FIG. 1A, the control device 100 may communicate with the display apparatus 200 in a wired or wireless mode.

The control device 100 is configured to control the display apparatus 200, may receive a command input from a user and convert the command into an instruction capable of being recognized and responded by the display apparatus 200, and plays an interaction intermediary role between the user and the display apparatus 200. For example, the user operates a channel up/down key on the control device 100, and the display apparatus 200 responds with a channel up/down operation.

The control device 100 may be a remote control 100A, including infrared protocol communication or Bluetooth protocol communication and other short-distance communication modes, and controls the display apparatus 200 in wireless or other wired modes. The user may input a command through keys on the remote control, voice input, control panel input and the like to control the display apparatus 200. For example, the user may input corresponding commands through a volume up/down key, a channel control key, an up/down/left/right directional key, a voice input key, a menu key, a power key and the like on the remote control, so as to realize the function of controlling the display apparatus 200.

The control device 100 may also be an intelligent device, such as a mobile terminal 100B, a tablet computer, a computer and a notebook computer. For example, an application running on the intelligent device is used to control the display apparatus 200. Through configuration, the application may provide various controls for the user on a screen associated with the intelligent device through an intuitive user interface (UI).

In some embodiments, software applications may be installed on both the mobile terminal 100B and the display apparatus 200, so as to realize connection and communication through a network communication protocol, and further achieve the purposes of one-to-one control operations and data communication. For example, a control instruction protocol may be established between the mobile terminal 100B and the display apparatus 200 to achieve functions of physical keys, for example, arranged on the remote control 100A by operating various functional keys or virtual buttons on the user interface provided on the mobile terminal 100B. Audio and video contents displayed on the mobile terminal 100B may also be cast on the display apparatus 200 so as to realize a synchronous display function.

The display apparatus 200 may provide a network television function that a computer support in addition to a broadcast reception function. The display apparatus may be implemented as a digital television, a network television, an Internet protocol television (IPTV), etc.

The display apparatus 200 may be a liquid crystal display, an organic light emitting display, and a projection device. Types, sizes, resolutions, and the like of specific display apparatus are not limited.

The display apparatus 200 may further perform data communication with a server 300 in multiple communication modes. Here, the display apparatus 200 may be allowed to perform communication connection through a local area network (LAN), a wireless local area network (WLAN) or the other networks. The server 300 may provide various contents and interactions for the display apparatus 200. Exemplarily, the display apparatus 200 may send and receive information, for example, receive electronic program guide (EPG) data, receive software program update or access a remotely-stored digital media library. The server 300 may be one or more groups, and may be one or more kinds of servers. Other network service contents such as video on demand and advertising service are provided through the server 300.

Figure 1B:
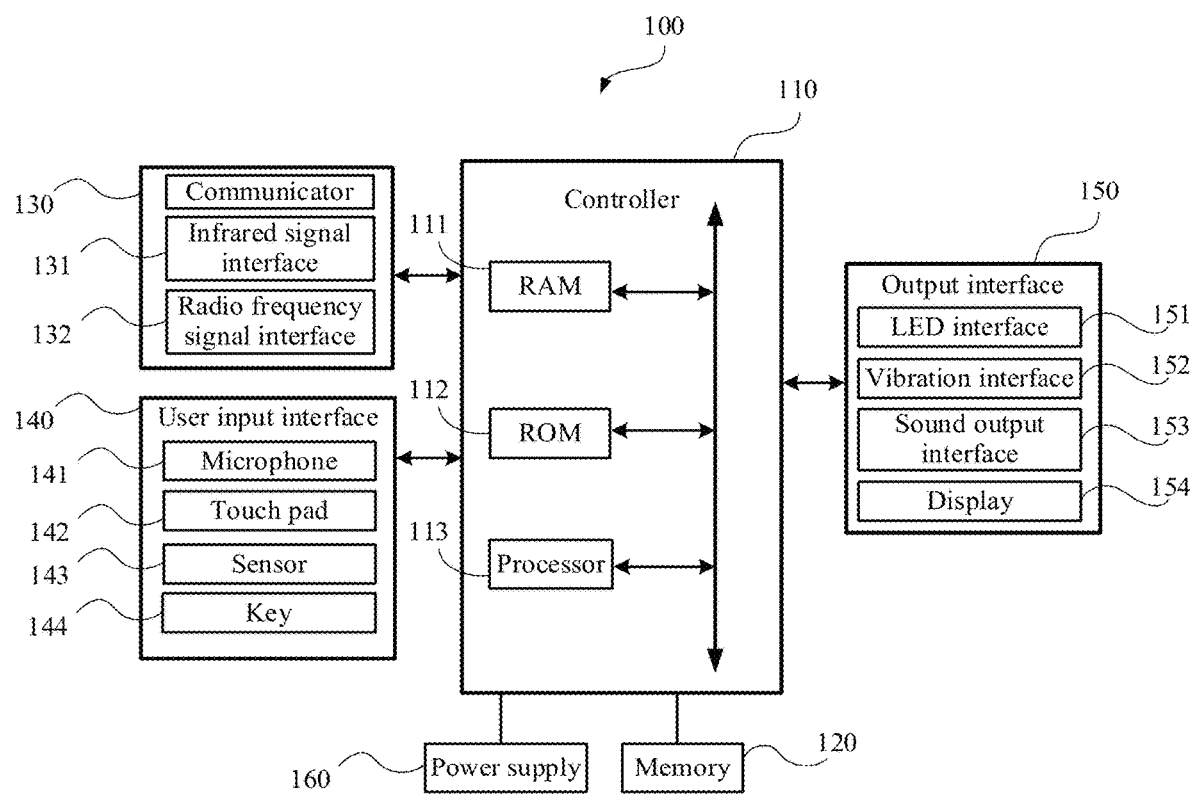
FIG. 1B illustrates a configuration block diagram of the control device 100 in FIG. 1A in an embodiment of the disclosure.

FIG. 1B illustrates a configuration block diagram of the control device 100. As shown in FIG. 1B, the control device 100 includes a controller 110, a memory 120, a communicator 130, a user input interface 140, an output interface 150, and a power supply 160.

The controller 110 includes a random access memory (RAM) 111, a read-only memory (ROM) 112, a processor 113, a communication interface and a communication bus. The controller 110 is configured to control running and operations of the control device 100, communication cooperation between all internal units, and external and internal data processing functions.

In some embodiments, when an interaction that the user presses a key arranged on the remote control 100A or touches a touch panel arranged on the remote control 100A is detected, the controller 110 may control to generate a signal corresponding to the detected interaction, and send the signal to the display apparatus 200.

The memory 120 is configured to store various running programs, data and applications for driving and controlling the control device 100 under control of the controller 110. The memory 120 may store various control signal instructions input from the user.

Under control of the controller 110, the communicator 130 realizes communication of a control signal and a data signal with the display apparatus 200. For example, the control device 100 sends a control signal (such as a touch signal or a button signal) to the display apparatus 200 through the communicator 130, and the control device 100 may receive, through the communicator 130, the signal sent from the display apparatus 200. The communicator 130 may include an infrared signal interface 131 and a radio frequency signal interface 132. For example, when the infrared signal interface is adopted, the user input instruction that needs to be converted into an infrared control signal according to an infrared control protocol, so as to be sent to the display apparatus 200 through an infrared sending module. For another example, when the radio frequency signal interface is adopted, the user input instruction that needs to be converted into a digital signal, and then the digital signal is modulated according to a radio frequency control signal modulation protocol and then sent to the display apparatus 200 through a radio frequency sending module.

The user input interface 140 may include at least one of a microphone 141, a touch panel 142, a sensor 143, or a key 144, so that the user may input commands for controlling the display apparatus 200 to the control device 100 through voice, touch, a gesture, pressing, etc.

The output interface 150 is configured to output the user commands received from the user input interface 140 to the display apparatus 200, or outputs an image or voice signal received from the display apparatus 200. Here, the output interface 150 may include a light-emitting diode (LED) interface 151, a vibration interface 152 for generating vibration, a sound output interface 153 for outputting sound, a display 154 for outputting an image, etc. For example, the remote control 100A may receive output signals such as audios, videos or data from the output interface 150, display the output signals on the display 154 in an image form, outputs the output signals on the sound output interface 153 in an audio form, or outputs the output signals on the vibration interface 152 in a vibration form.

The power supply 160 is configured to provide power support for all elements of the control device 100 under control of the controller 110. The power supply may be in the form of a battery and a relevant control circuit.

Figure 1C:
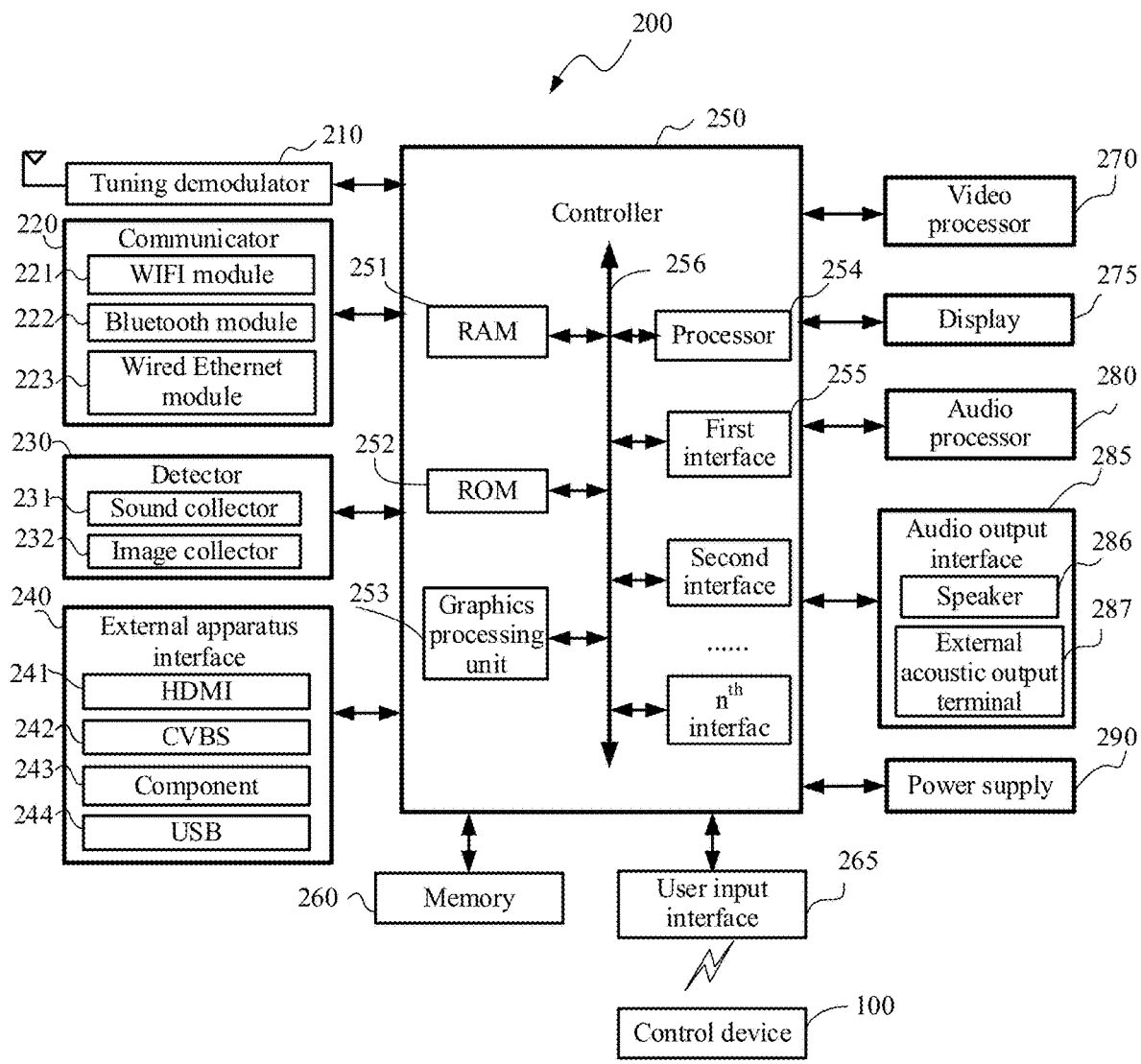
FIG. 1C illustrates a configuration block diagram of the display apparatus 200 in FIG. 1A in an embodiment of the disclosure.

FIG. 1C illustrates a block diagram of hardware configuration of the display apparatus 200. As shown in FIG. 1C, the display apparatus 200 may include a tuning demodulator 210, a communicator 220, a detector 230, an external apparatus interface 240, a controller 250, a memory 260, a user input interface 265, a video processor 270, a display 275, an audio processor 280, an audio output interface 285, and a power supply 290.

The tuning demodulator 210 is configured to receive broadcast television signals in a wired or wireless mode, may perform modulation-demodulation processing such as amplification, frequency mixing and resonance, and is configured to demodulate an audio and video signal carried in a frequency of a television channel selected by the user and additional information (for example, an EPG data) from the plurality of wireless or cable broadcast television signals.

The tuning demodulator 210 may respond to the frequency of the television channel selected by the user and the television signal carried by the frequency under control of the controller 250 according to user selection.

According to different broadcast systems of the television signals, the tuning demodulator 210 may receive signals in multiple ways, for example: terrestrial digital television, cable broadcasting, satellite broadcasting or Internet broadcasting; according to different modulation types, the tuning demodulator may adopt a digital modulation mode or an analog modulation mode; and according to the different types of received television signals, an analog signal and a digital signal may be demodulated.

In some other exemplary embodiments, the tuning demodulator 210 may also be in an external device, such as an external set top box. In this way, the set top box outputs the television signals after modulation and demodulation to input the signals into the display apparatus 200 through the external apparatus interface 240.

The communicator 220 is a component configured to communicate with an external device or an external server according to various communication protocol types. For example, the display apparatus 200 may send content data to the external device connected via the communicator 220, or browse and download the content data from the external device connected via the communicator 220. The communicator 220 may include a WIFI module 221, a Bluetooth communication protocol module 222, a wired Ethernet communication protocol module 223, and other network communication protocol modules or near field communication protocol modules, so that the communicator 220 may receive the control signal of the control device 100 according to control of the controller 250, and implement the control signal as a WIFI signal, a Bluetooth signal, a radio frequency signal and the like.

The detector 230 is a component for the display apparatus 200 to collect a signal from an external environment or a signal interacting with the outside. The detector 230 may include a sound collector 231, such as a microphone, which may be configured to receive sound of the user, for example, a voice signal of a command from a user to control the display apparatus 200; or may collect environmental sound for recognizing environmental scene types, so that the display apparatus 200 may be self-adaptive to environmental noise.

In some other embodiments, the detector 230 may further include an image collector 232, such as a camera and a webcam, which may be configured to collect an external environment scene, so as to change display parameters of the display apparatus 200 accordingly; and configured to collect attributes of the user or interact with the user via gestures, so as to realize an interaction function between the display apparatus and the user.

In some other embodiments, the detector 230 may further include an optical receiver, configured to collect an environment light intensity so as to adjust the display parameters of the display apparatus 200 accordingly.

In some other embodiments, the detector 230 may further include a temperature sensor, for example, the display apparatus 200 may adjust a display color temperature of an image by sensing an environment temperature. Exemplarily, when the environment temperature is high, the color temperature of the image on the display apparatus 200 may be adjusted to a relatively cold tune; and when the environment temperature is low, the color temperature of the image on the display apparatus 200 may be adjusted to a relatively warm tune.

The external apparatus interface 240 is a component for providing the controller 250 with controlling over data transmission between the display apparatus 200 and an external device. The external apparatus interface 240 may be connected with external devices such as a set top box, a game apparatus and a notebook computer in a wired/wireless mode, and may receive data such as a video signal (such as a motion image), an audio signal (such as music), additional information (such as EPGs) from the external devices.

The external apparatus interface 240 may include: any one or more of a high definition multimedia interface (HDMI) interface 241, a composite video blanking synchronization (CVBS) interface 242, an analog or digital component interface 243, a universal serial bus (USB) interface 244, a component interface (not shown in the figure), or a red, green and blue (RGB) interface (not shown in the figure).

The controller 250 is configured to control working of the display apparatus 200 and responds to operations from the user by running various software control programs (such as an operating system and various applications) stored on the memory 260.

As shown in FIG. 1C, the controller 250 includes a RAM 251, a ROM 252, a graphics processing unit 253, a central processing unit (CPU) 254, a communication interface 255, and a communication bus 256. The RAM 251, ROM 252, the graphics processing unit 253, the CPU 254 and the communication interface 255 are connected through the communication bus 256.

The ROM 252 is configured to store various system initialization instructions. For example, when a power-on signal is received, a power source of the display apparatus 200 begins to start, the CPU 254 runs the system initialization instructions in the ROM 252 to copy an operating system stored in the memory 260 into the RAM 251 so as to begin to run to initialize the operating system. After the operating system is initialized, the CPU 254 copies the various applications in the memory 260 into the RAM 251 again, and then, begins to run to launch the various applications.

The graphics processing unit 253 is configured to generate various graphic objects, such as an icon, an operating menu, user input instruction display graphics and the like. The graphics processing unit 253 may include an arithmetic unit, configured to perform computation by receiving various interactive instructions input from the user and then display various objects according to a display attribute; and include a renderer, configured to generate the various objects obtained based on the arithmetic unit and display a rendered result on the display 275.

The CPU 254 is configured to execute the operating system and the application instructions stored in the memory 260, and execute processing of the various applications, data and contents according to the user input instruction, so as to finally display and play the various audio and video contents.

In some embodiments, the CPU 254 may include a plurality of processors. The plurality of processors may include one main processor and one or more sub processors. The main processor is configured to execute some initialization operations of the display apparatus 200 in a preloading mode, and/or execute the operation of displaying pictures in a normal mode. The one or more sub processors are configured to execute one operation in a standby mode and other states.

The communication interface 255 may include a first interface to an $n^{th}$ interface. These interfaces may be network interfaces connected to an external device via a network.

The controller 250 may control the overall operation of the display apparatus 200. For example: in response to receiving a user input instruction for selecting a graphical user interface (GUI) object shown on the display 275, the controller 250 may execute the operation relevant to the object selected by the user input instruction.

The object may be any one of optional objects, such as a hyperlink or an icon. The operation relevant to the selected object may be, for example, an operation of displaying a hyperlink page, a document, an image and the like, or an operation of executing an application corresponding to the object. The user input instruction for selecting the GUI object may be an instruction input through various input devices (such as a mouse, a keyboard, a touch pad and the like) connected to the display apparatus 200, or a voice instruction corresponding to a voice uttered by the user.

The memory 260 is configured to store various types of data, software programs or applications for driving and controlling the display apparatus 200 to run. The memory 260 may include a volatile and/or nonvolatile memory. The term "memory" includes the memory 260, the RAM 251 and ROM 252 of the controller 250, or a memory card in the display apparatus 200.

In some embodiments, the memory 260 is specifically configured to store a running program for driving the controller 250 in the display apparatus 200; store various applications which are built in or downloaded by the user from an external device of the display apparatus 200; and store data for configuring the various GUIs provided by the display 275, the various objects relevant to the GUIs, and visual effect images of the selector configured to select the GUI objects.

In some embodiments, the memory 260 is specifically configured to store driving programs and relevant data of the tuning demodulator 210, the communicator 220, the detector 230, the external apparatus interface 240, the video processor 270, the display 275, the audio processor 280 and the like, for example, external data (such as audio and video data) received from the external apparatus interface, or user data (such as key information, voice information, and touch information) received from a user input interface.

In some embodiments, the memory 260 specifically stores software and/or programs configured to represent the operating system (OS). These software and/or programs may include, for example: a kernel, middleware, an application programming interface (API) and/or applications. In some embodiments, the kernel may control or manage system resources, and functions implemented by other programs (such as the middleware, the API or the applications); and meanwhile, the kernel may provide an interface so as to allow the middleware, the API or the applications to access the controller to control or manage the system resources.

Figure 1D:
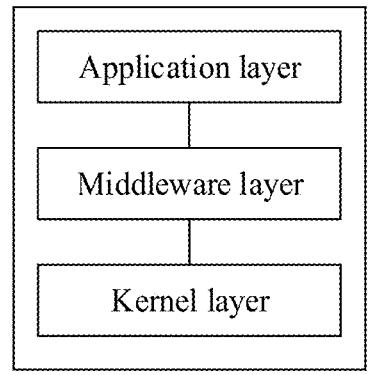
FIG. 1D illustrates a block diagram of architecture configuration of an operating system in a memory of a display apparatus 200 in an embodiment of the disclosure.

FIG. 1D illustrates a block diagram of architecture configuration of the operating system in the memory of the display apparatus 200. The architecture of the operating system includes an application layer, a middleware layer and a kernel layer from top to bottom.

The built-in applications of the system and non-system-level applications belong to the application layer. The application layer is responsible for directly interacting with the user. The application layer may include a plurality of applications, such as a setup application, e-pos application, and a media center application. These applications may be implemented as Web applications which are executed based on a WebKit engine, and specifically may be developed and executed based on hypertext markup language (HTML) 5, a cascading style sheet (CSS), and JavaScript.

The middleware layer may provide some standard interfaces so as to support operations of various environments and systems. For example, the middleware layer may be implemented as a multimedia and hypermedia information coding expert group (MHEG) of the middleware related to data broadcasting, may further be implemented as digital living network alliance (DLNA) middleware related to external device communication, and may further be implemented as middleware providing browser environments running by all the applications in the display apparatus.

The kernel layer provides core system services, for example: file management, memory management, process management, network management and system security permission management. The kernel layer may be implemented as a kernel based on various operating systems, for example, a kernel based on a Linux operating system.

The kernel layer also provides communication between system software and hardware at the same time, and provides device driving services for various hardware, for example: provides a display driver for the display, provides a webcam driver for the webcam, provides a key driver for the remote control, provides a WiFi driver for a WIFI module, provides an audio driver for an audio output interface, provides power management driver for a power management (PM) module.

The user input interface 265 receives various user interactions. Specifically, the user input interface is configured to send an input signal from the user to the controller 250, or transmits an output signal from the controller 250 to the user. In some embodiments, the remote control 100A may send the input signals, such as a power signal, a channel selection signal, and a volume adjusting signal which are input from the user to the user input interface 265, and then the input signals are forwarded to the controller 250 by the user input interface 265; or the remote control 100A may receive the output signals such as audios, videos or data, output from the user input interface 265 and processed by the controller 250, and display the output signals or output the output signals in an audio or vibration form.

In some embodiments, the user may input a user instruction on the GUI displayed on the display 275, and then the user input interface 265 receives the user input instruction through the GUI. Specifically, the user input interface 265 may receive the user input instruction for controlling the position of the selector on the GUI to select the different objects or items.

Or, the user may input the user instruction by inputting specific sound or gesture, and then the user input interface 265 recognizes the sound or the gesture through the sensor so as to receive the user input instruction.

The video processor 270 is configured to receive an external video signal, and perform video data processing such as decompression, decoding, scaling, noise reduction, frame rate conversion, resolution conversion and image synthesis according to a standard encoding and decoding protocol of the input signal, so as to obtain the video signal directly displayed or played on the display 275.

Exemplarily, the video processor 270 includes a demultiplexing module, a video decoding module, an image synthesis module, a frame rate conversion module, a display formatting module, and the like.

The image synthesis module, such as an image synthesizer, is configured to perform overlay processing on the GUI signal generated by a graphic generator (for example, on-screen display, a screen menu adjustment mode, OSD for short) according to the user input or itself and a video image subjected to scaling processing, so as to generate an image signal for being displayed.

The frame rate conversion module is configured to convert a frame rate of the input video, for example, converting the frame rate of an input 60 Hz video into the frame rate of 120 Hz or 240 Hz, and the usual format is implemented via frame interpolation.

The display formatting module is configured to change the signal output by the frame rate conversion module into a signal conforming to a format of the display, for example, performing format conversion on the signal output from the frame rate conversion module so as to output an RGB data signal.

The display 275 is configured to receive the image signal input from the video processor 270 and display a video content, an image and a menu manipulating interface. The displayed video content may come from the video content in the broadcast signal received by the tuning demodulator 210, or the video content input from the communicator 220 or the external apparatus interface 240. The display 275 simultaneously displays the user manipulating interface UI generated in the display apparatus 200 and configured to control the display apparatus 200.

The display 275 may include a display screen component configured to present a picture and a driving component for driving image display. Or, if the display 275 is a projection display, it may further include a projection apparatus and a projection screen.

The audio processor 280 is configured to receive an external audio signal and perform audio data processing such as decompression, decoding, noise reduction, digital-to-analog conversion and amplifying processing according to a standard encoding and decoding protocol of the input signal, so as to obtain an audio signal for being played in a speaker 286.

In some embodiments, the audio processor 280 may support various audio formats, for example, MPEG-2, MPEG-4, advanced audio coding (AAC) and high-efficiency AAC (HE-AAC).

The audio output interface 285 is configured to receive the audio signal output from the audio processor 280 under control of the controller 250. The audio output interface 285 may include the speaker 286, or an external acoustic output terminal 287 output to a sound generating device of an external device, such as an earphone output terminal.

In some other embodiments, the video processor 270 may include one or more chips. The audio processor 280 may also include one or more chips.

In some other embodiments, the video processor 270 and the audio processor 280 may be in individual chips, or be integrated in one or more chips together with the controller 250.

The power supply 290 is configured to provide electric power by an external power source for the display apparatus 200 as power supply support under control of the controller 250. The power supply 290 may be a built-in power supply circuit installed in the display apparatus 200, or a power source installed outside the display apparatus 200.

Now when a user uses an intelligent television and switches a live channel, the user needs to continuously input a channel for switching through a remote control and then clicks an "confirm" key, or wait for a period of time, so that the intelligent television may perform channel switching. Even if when a length of a channel number input by a user reaches a maximum channel number length, the user further needs to click the "confirm" key or wait for a period of time without recognizing that the channel number input by the user has reached a maximum length to switch the channel, and thus the user experience is poor. Moreover, the user will continue to click a numeric key on the remote control because the intelligent television cannot recognize that the channel number input by the user has reached the maximum length to switch the channel, consequently, the length of the finally input channel number is greater than the maximum length, and the channel cannot be switched.

Therefore, an embodiment of the disclosure provides: a display apparatus receives at least one channel number information from the user through a control device according to a channel number sequence, so as to obtain the channel number, for example, the user respectively input 1, 2 and 3 in order, and the channel number is 123. When the display apparatus receives the channel number information including the channel number input from the user so as to obtain one channel number each time, whether the length of the channel number reaches the maximum length of the channel number is determined. If so, the channel of the display apparatus is directly switched to the channel corresponding to the channel number, or directed to the channel designated by the channel number without inputting "confirm" by the user or switching or directing after waiting; moreover, the user is prevented from continuing to input the channel number information, thereby improving the flexibility of the display apparatus, and improving the user experience.

Figure 3A:
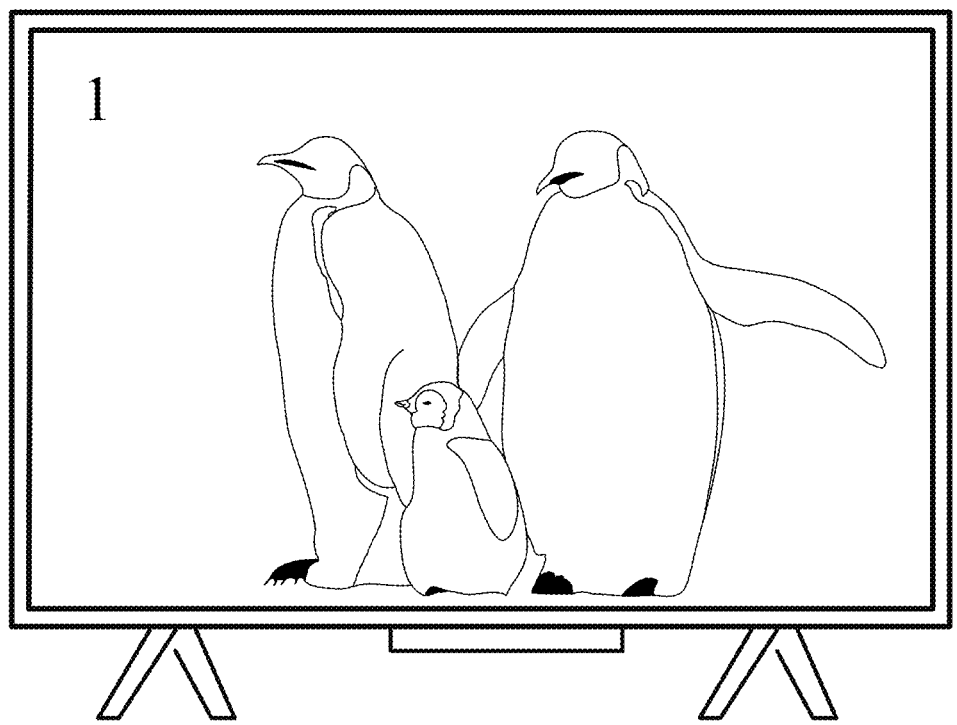
FIGS. 3A-3C illustrate schematic diagrams of channel switching of a display apparatus 200 by operating a control device 100 in an embodiment of the disclosure.
Figure 3B:
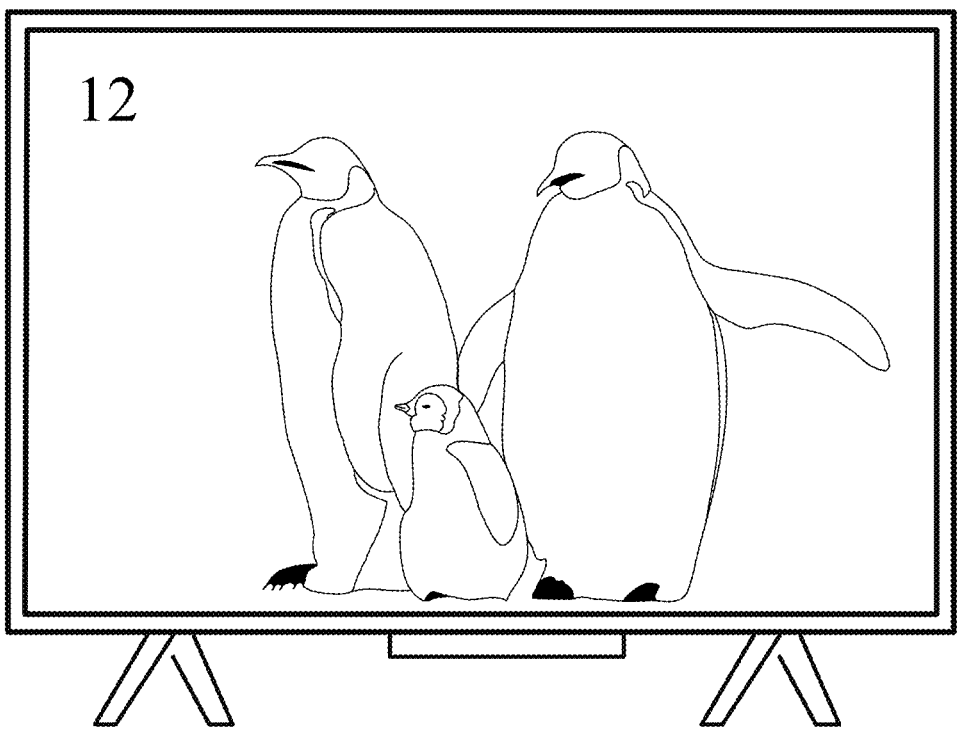
Figures 3C, 4A:
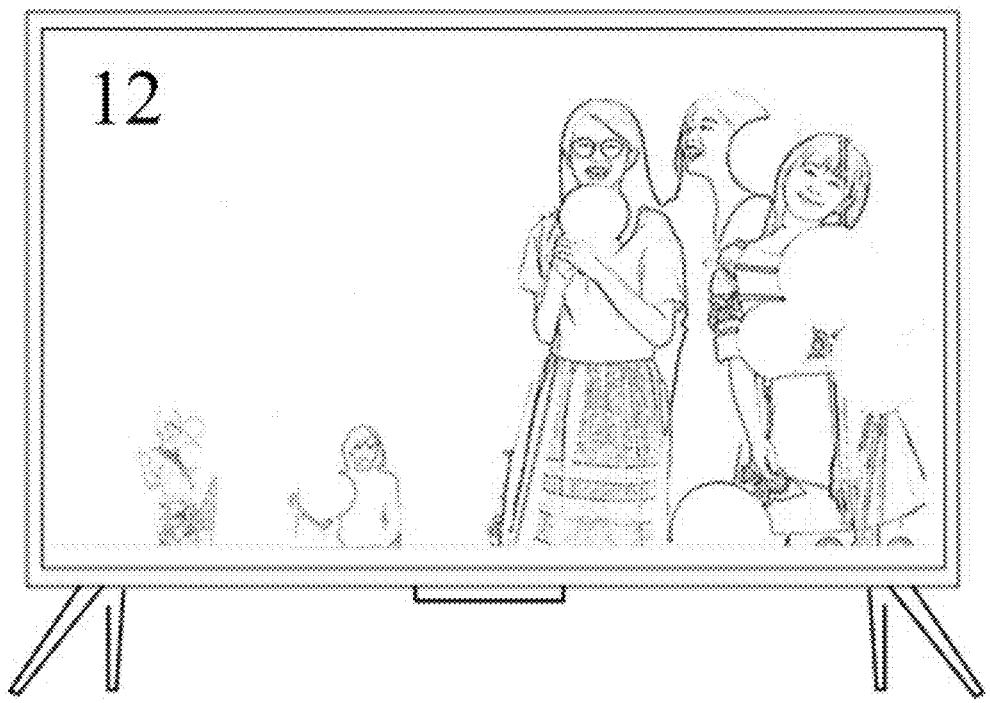
FIGS. 4A-4D illustrate schematic diagrams of channel positioning of a display apparatus 200 on an EPG user interface by operating a control device 100 in an embodiment of the disclosure.

FIGS. 3A-3C illustrate schematic diagrams of a GUI 400 on a display apparatus 200 by operating a control device 100.

Figure 2:
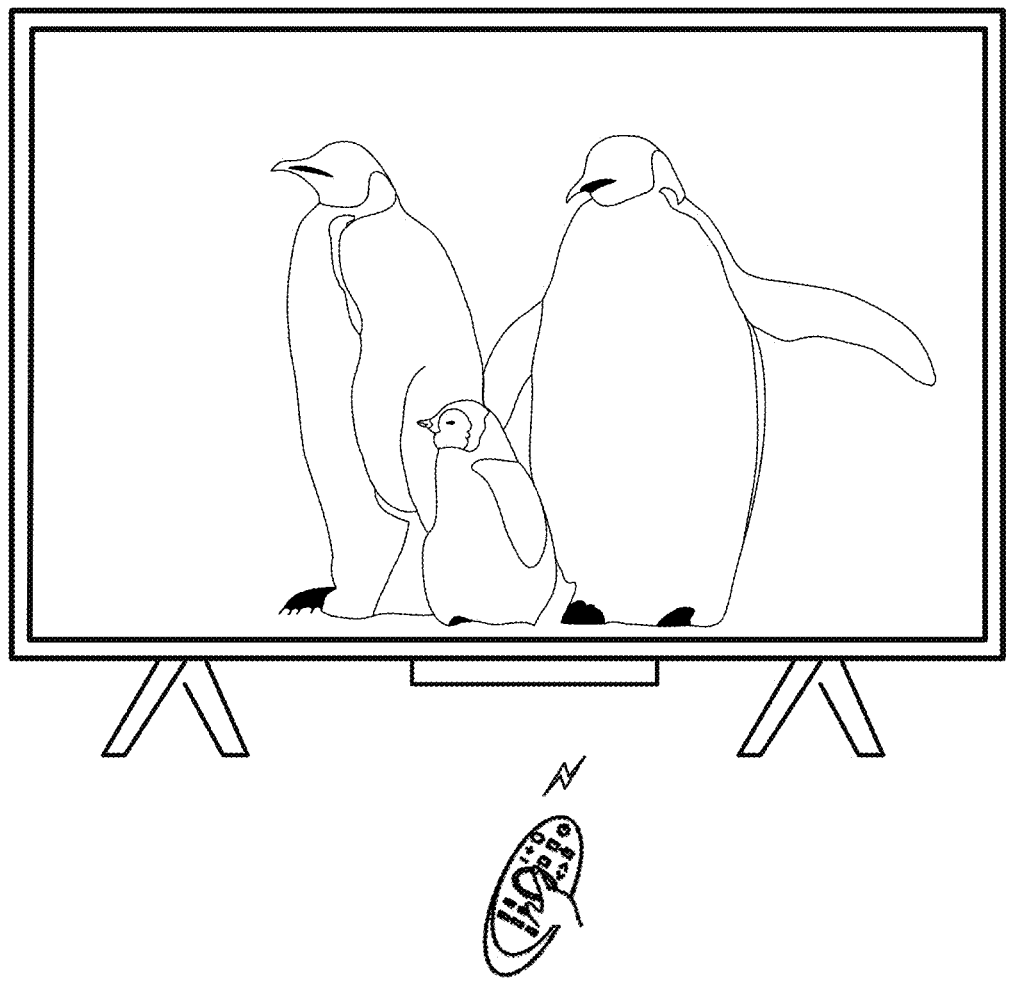
FIG. 2 illustrates a schematic diagram of a broadcast program picture in an embodiment of the disclosure.

As shown in FIG. 2, when a program content of a first channel indicated by a first channel number is being played on a display of the display apparatus, the user inputs an instruction for indicating channel number information to the display apparatus by pressing keys on the remote control, for example, a number key, "−", ".". One channel number needs the user to at least input the instruction for indicating the channel number information once, and the display apparatus obtains a second channel number in response to receiving an instruction for indicating the channel number information each time. For example, when the user presses the number key "1", the second channel number obtained by the display apparatus is 1, as shown in FIG. 3A, on the display of the display apparatus, the second channel number 1 is displayed above the program content of the first channel on the display; and then the user presses the number key "2", the second channel number obtained by the display apparatus is updated as 12, as shown in FIG. 3B, the second channel number shown on the display is 12.

If a maximum channel number length corresponding to channels of a current channel type is 2 bits, after the display apparatus obtains the second channel number in response to receiving an instruction for indicating the channel number information each time, whether a length of the second channel number is equal to the maximum length of the channel number is determined, if the length of the second channel number is equal to the maximum length of the channel number, the display apparatus directly switches the program content of the first channel to a program content of a channel indicated by the second channel. For example, when the user presses the number key "1", the second channel number obtained by the display apparatus is 1, the length of the second channel number "1" is 1, the length "1" is compared with a maximum length of the channel number "2", and it is apparent that the length of the second channel number is smaller than the maximum length of the channel number.

If the user presses the number key "2", the second channel number obtained by the display apparatus is 12, at this time, the length of the second channel number "12" is 2, the length "2" is compared with a preset maximum length "2", it is apparent that the length of the second channel number is equal to the preset maximum length, and the display apparatus directly switches the program content of the first channel to the program content of the channel indicated by the second channel number 12, thereby improving an operation experience of the user. Moreover, when the length of the second channel number is equal to the preset maximum length and the user presses the number key within a first preset duration, the display apparatus does not respond, where the first preset duration may be, for example, 1 second, and the specific numeric value is not limited in the embodiments of the disclosure. Thus a situation that the length of the second channel number is greater than the preset maximum length due to misoperation or pressing remote control keys by the user for a long time and the like, and consequently, the display apparatus cannot display the channel corresponding to the second channel number is avoided.

FIGS. 4A-4D illustrate schematic diagrams of the GUI 400 on the display apparatus 200 by operating the control device 100.

From the above FIGS. 1A-1D, it should be noted that: the display apparatus usually displays an EPG on it, so that the user may utilize a menu provided by the EPG to view programs (such as program content brief, profiles of actors and directors) of all channels, or make a schedule for recording future programs, and the like. An EPG user interface arranges and displays broadcast programs in a matrix form, usually displays channels and times in a two-dimension manner, and displays all the broadcast programs in the EPG in a size proportional to broadcast time lengths of the broadcast programs.

A display process of the EPG is: referring to FIG. 1C, a tuning modulator 210 of the display apparatus receives a broadcast signal, and a decoder (not shown in the figure) extracts EPG information from the received broadcast signal, and outputs the extracted EPG information to an internal bus, so that a controller 250 stores the EPG information output to the internal bus in a memory 260 for displaying the EPG user interface.

On the display 275 of the display apparatus, when a program picture as shown in FIG. 2 is displayed currently, the user inputs an EPG display request signal via a user input interface 265 to the controller 250. For example, pressing a key for showing EPG on a remote control, that is, in response to an EPG display request sent from the user, the controller 250 controls to read EPG information from the memory 260, so that an EPG generator (not shown in the figure) may create the EPG according to the EPG information read from the memory, and then the EPG user interface shown in FIG. 4A is shown on the display 275 through a video processor 270.

FIG. 4A is a schematic diagram of the EPG user interface. As shown in FIG. 4A, a vertical direction is a channel direction, the plurality of channels in a channel list are displayed in a multi-row form, where a selector is positioned on a first channel in the EPG user interface, as shown in a region 42 in FIG. 4A. A horizontal direction is a time direction, all the broadcast programs in each row are arranged according to playing time, a size of a display region of each broadcast program indicates its broadcast time length, a starting position of the display region indicates its playing start point, an ending position of the display region indicates its playing end point, and its program name is displayed in the display region. In FIG. 4A, the EPG user interface shows five channels (DC1-DC5), programs of each channel are arranged and displayed as one row according to the program playing time, as shown in a region 41 in FIG. 4A. For example, FIG. 4A shows a broadcast program menu between 4:00 PM and 6:00 PM, broadcast programs 10-13 of a DC1 channel, broadcast programs 20-25 of a DC2 channel, broadcast programs 30-36 of a DC3 channel, broadcast programs 40-48 of a DC4 channel, and broadcast programs 50-57 of a DC5 channel. A region 43 in FIG. 4A may be, for example, configured to play program content of a channel selected by the selector.

It should be noted that a display form of the selector may be a focus, and an identification form for the focus is not limited. Exemplarily, in FIG. 4A, a position of the focus object is implemented or identified by setting a background color for the item, or the position of the focus object may also be identified by changing a border line, a size, transparency, an outline and/or a font of a text or an image of a focus item.

Figure 4B:
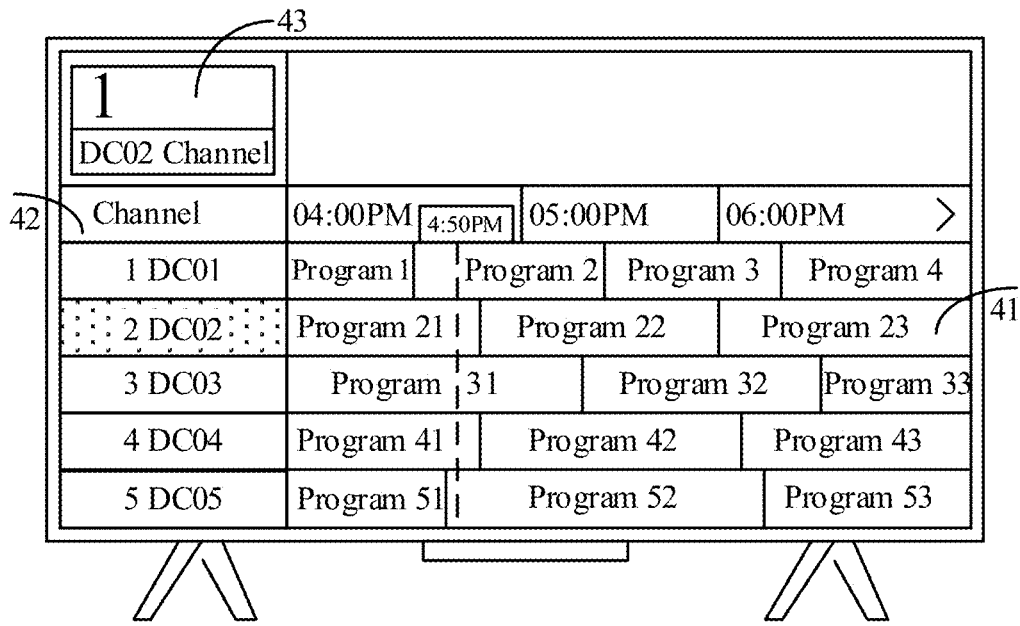

After the display shows a picture shown in FIG. 4A, the user inputs an instruction for indicating the channel number information to the display apparatus by pressing keys that form the channel number on the remote control, for example, a number key, "–", ".". Referring to description of channel switching of the display apparatus during broadcast, the user inputs the instruction for indicating the channel number information to the display apparatus by pressing a number key "1" on the remote control; the display apparatus obtains the second channel number 1 in response to the instruction for indicating the channel number information, and displays the second channel number 1 on an interface as shown in FIG. 4A so as to obtain an interface as shown in FIG. 4B; and then the user presses a number key "2", the second channel number obtained by the display apparatus is updated to be 12, as shown in FIG. 4C, the second channel number shown on the display is 12.

Figure 4C:
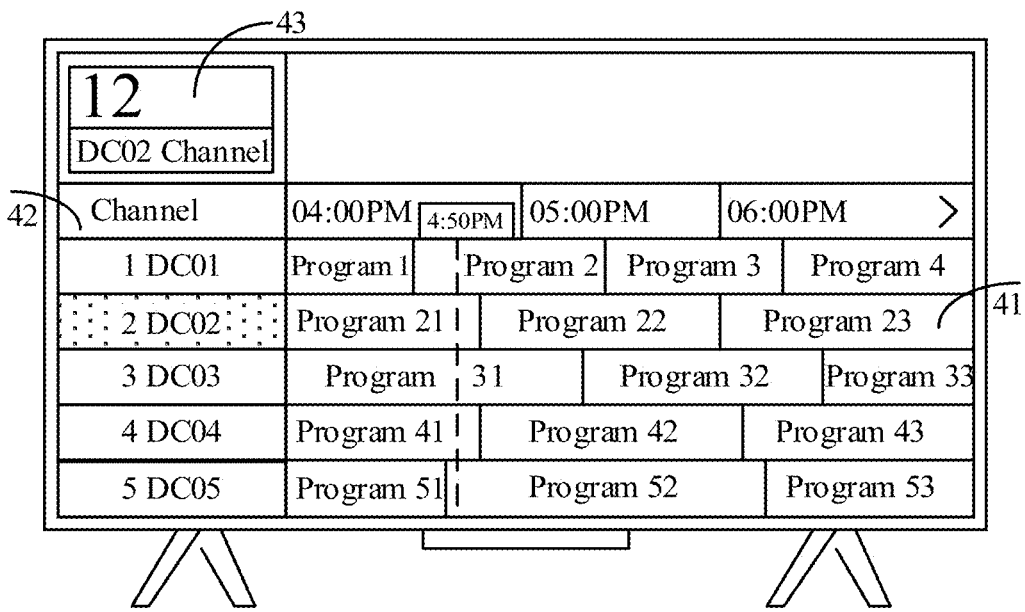
Figure 4D:
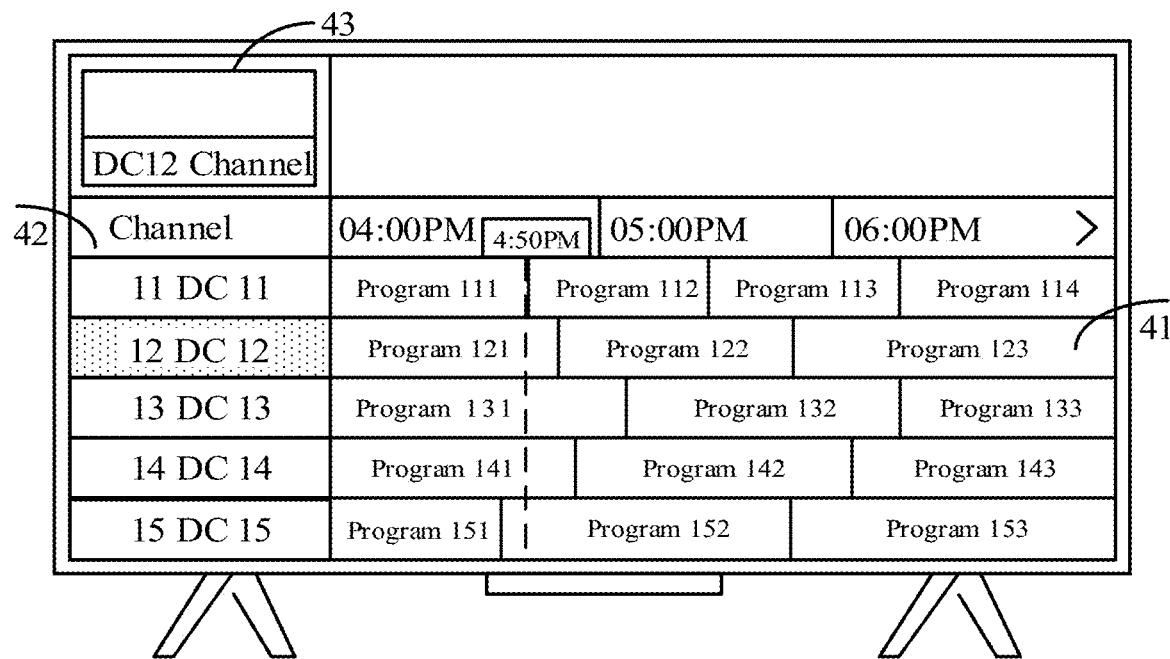

If a maximum length of a channel number corresponding to a current channel type is 2 bits, after obtaining the second channel number, the display apparatus directly updates the EPG user interface shown in FIG. 4C to obtain the EPG user interface as shown in FIG. 4D, where as shown in FIG. 4D, the selector is positioned at a channel indicated by the second channel number 12 in the channel list. Moreover, when the user further presses a number key within a first preset duration after the length of the second channel number reaches the maximum length of the current channel type, the display apparatus does not respond.

FIGS. 5A-5D illustrate schematic diagrams of the GUI 400 on the display apparatus 200 by operating the control device 100.

Figure 5A:
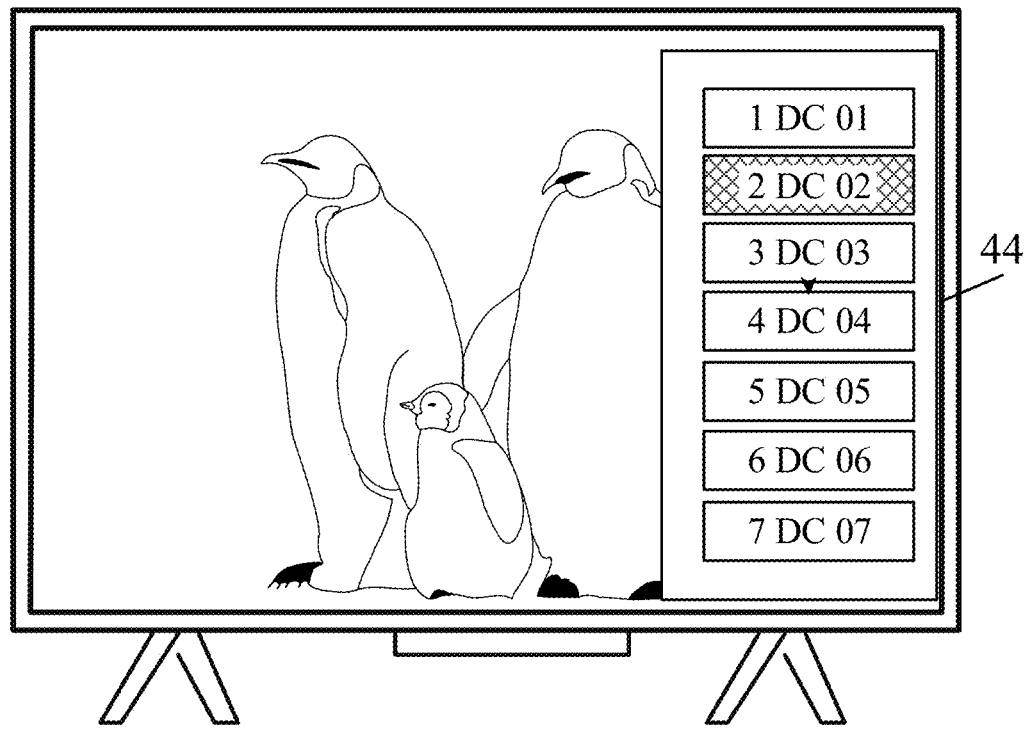
FIGS. 5A-5D illustrate schematic diagrams of channel positioning of a display apparatus 200 on a channel list user interface by operating a control device 100 in an embodiment of the disclosure.

As shown in FIG. 2, when the display of the display apparatus is playing the content of the first channel indicated by the first channel number, for example, when the user needs to find a channel for a program schedule on this channel in a future time, the user may input an instruction for showing a channel list to the display apparatus by pressing a key on the remote control for showing channel list; and the display apparatus provides a GUI to the display in response to the instruction for showing channel list, as shown in FIG. 5A. The GUI is a channel list user interface, the plurality of channels in the channel list are displayed on the channel list user interface, and the selector is positioned on a first channel in the channel list user interface, as shown in a region 44.

Figure 5B:
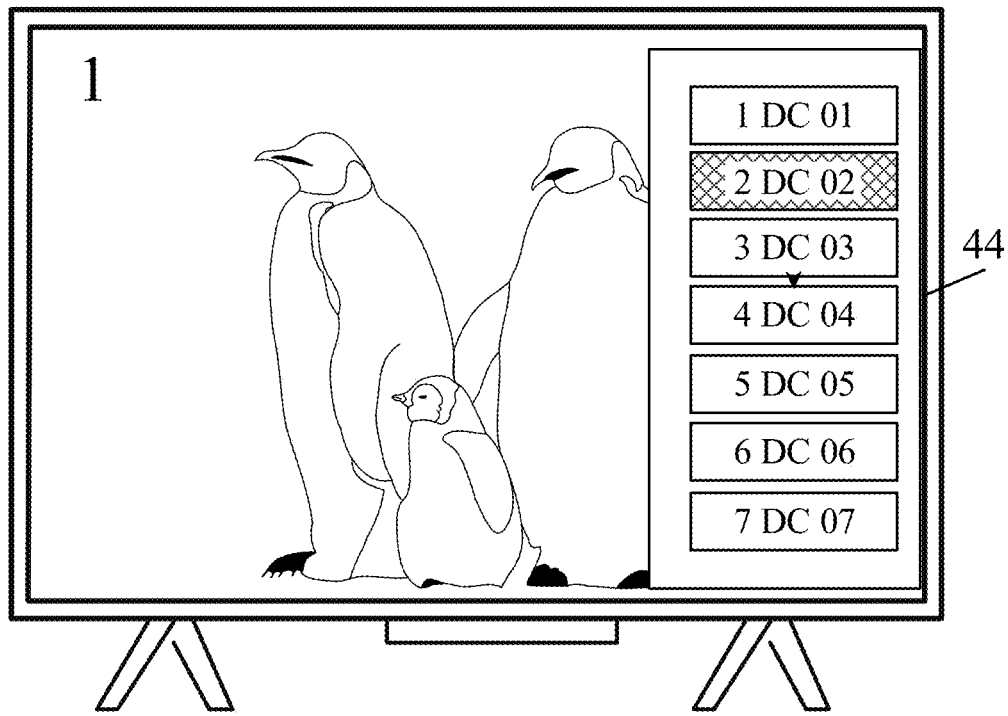

After the display shows a picture in FIG. 5A, the user inputs an instruction for indicating the channel number information to the display apparatus by pressing keys that construct a channel number on the remote control, for example, a number key, "–", ".". Referring to channel switching of the display apparatus during broadcast, the user inputs the instruction for indicating the channel number information to the display apparatus by pressing the number key "1" on the remote control; the display apparatus obtains a second channel number 1 in response to the instruction for indicating the channel number information, and displays the second channel number 1 on the interface as shown in FIG. 5A so as to obtain the interface as shown in FIG. 5B; and then the user presses the number key "2", the second channel number obtained by the display apparatus is updated to be 12, and as shown in FIG. 5C, the second channel number shown on the display is 12.

Figure 5C:
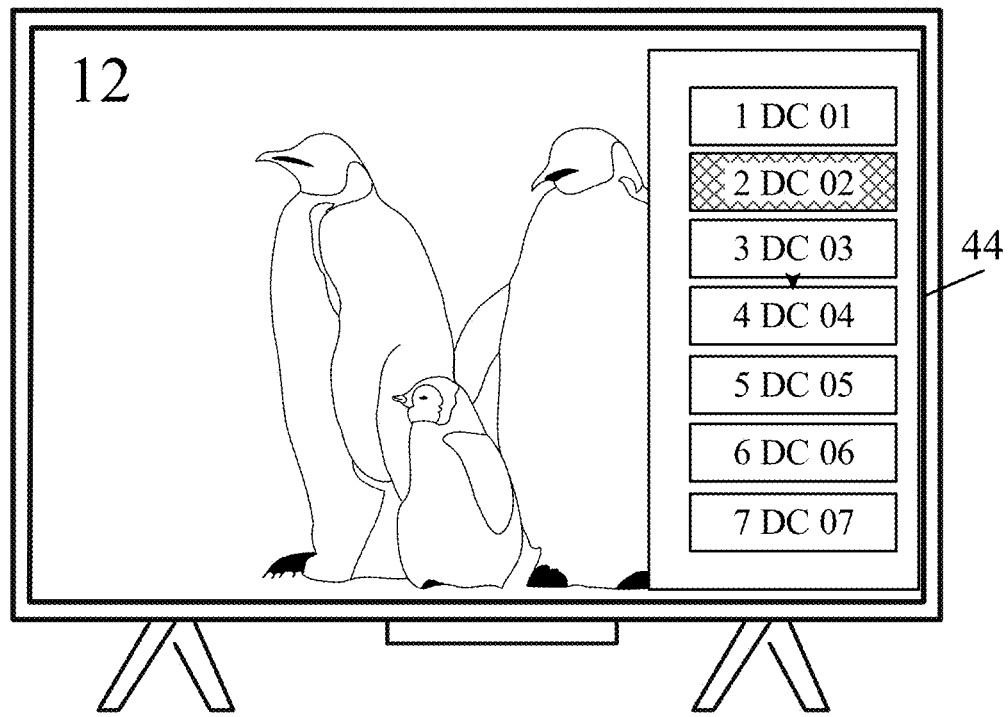
Figure 5D:
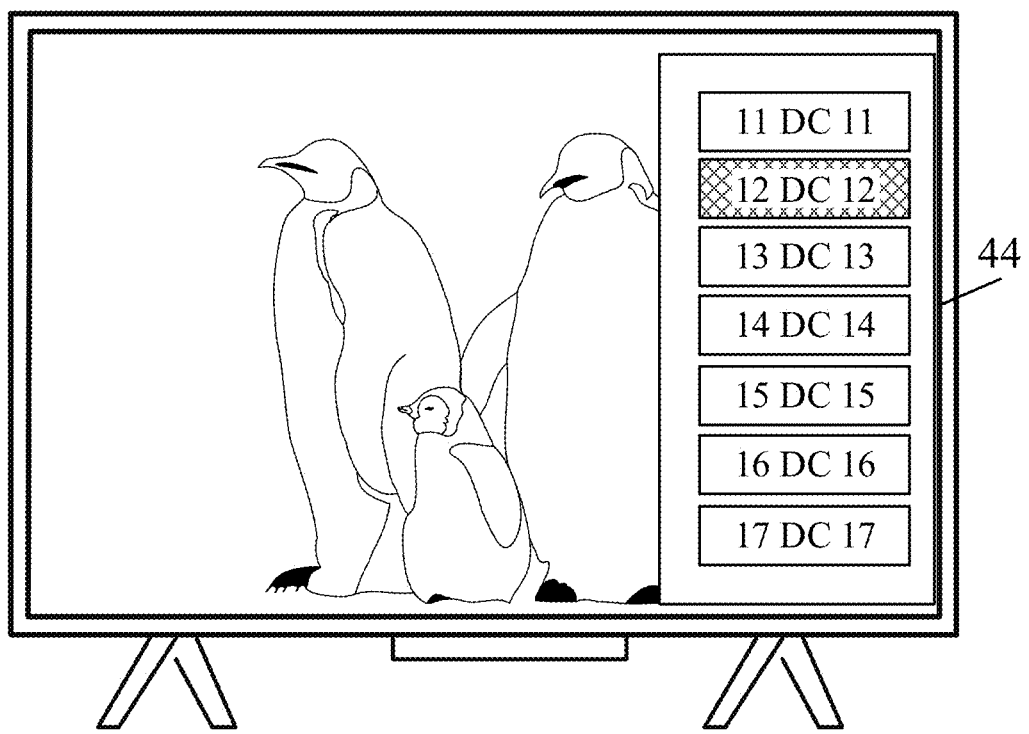

If the maximum length of the channel number corresponding to the current channel type is 2, after obtaining the second channel number, the display apparatus directly updates the EPG user interface shown in FIG. 5C to obtain the EPG user interface as shown in FIG. 5D; where as shown in FIG. 5D, the selector is positioned at the channel indicated by the second channel number 12 in the channel list. Moreover, when the user presses a number key within a first preset duration, the display apparatus will not respond.

The three modes that the display apparatus locates a channel on the EPG user interface and the channel list user interface are illustrated below by taking channel switching during broadcast as an example. Relevant description for how the display apparatus locates a channel on the EPG user interface and the channel list user interface may refer to the description when the display apparatus switches channels during broadcast.

Every time an instruction for indicating the channel number information is received from a user, the display apparatus starts a timer. If the timer is not started from zero, the timer is reset to start from zero. Further referring to the above example, after the user presses the number key "1", the timer is started from zero. The length of the second channel number is "1", and is smaller than the preset maximum length. If the user does not press the key that construct a channel number within a second preset duration, when a duration recorded by the timer reaches the second preset duration, as shown in FIG. 3A, the display apparatus switches the program content of the first channel to program content of a channel indicated by a second channel number 1.

Moreover, when the second channel number obtained by the display apparatus is "1", if the user presses an "OK" key within the second preset duration, the display apparatus receives an instruction for indicating channel switching; and in response to the instruction for indicating channel switching, as shown in FIG. 3A, the display apparatus switches the program content of the first channel shown on the display to the program content of the channel indicated by the second channel number 1.

It should be noted that if the preset maximum length of the channel number is 3 bits, after the second channel number obtained by the display apparatus is 1, if the user presses the number key "2" within the second preset duration, the display apparatus obtains the second channel number 12 in response to the instruction for indicating the channel number information from the user, the timer is started, and reset to restart timing.

When the user presses a key on the remote control to input an instruction for indicating the channel number information to the display apparatus, for example, when the user presses a certain number key, the user may hold too long after pressing the keys, the remote control may repeatedly send the instruction for indicating the channel number information corresponding to the key. For example, the user wants to input a channel number 123, because a pressing time of the user on the key "1" is too long, the user continuously inputs the instruction for indicating the channel number information corresponding to the key "1". For example, the second channel number obtained by the display apparatus is 111, and if the preset maximum length of the channel number of the display apparatus is 3 bits, the display apparatus directly switches to a program content corresponding to the second channel number 111. Apparently, this is not program content that the user intends to watch, resulting in poor user experience.

Therefore, in the embodiments of the disclosure, when the remote control detects that the user presses the number key 1 for an excessively long time, the remote control sends the number key 1 to the display apparatus firstly, then repeatedly sends the number key 1 event to the display apparatus and reports a "repeat" attribute. The repeat attribute is configured to indicate whether pressing of a number key is regarded as being pressed repeatedly. If the display apparatus receives a second key event for number key 1 after receiving a first key event for number key 1 and a repeat attribute associated with the number key 1, the display apparatus may ignore the repeated key event operation when the value of the repeat attribute is true, that is, ignoring the repeatedly reported key events for the number key 1 since the value of the repeat attribute is true. The display apparatus only shows numeric digit 1 once in the channel number instead of showing numeric digit 1 for two times or multiple times, in this way, the presented channel is corrected even if the user may have misoperation of the remote control. The display apparatus may display digit 1 once in the channel number when the repeat attribute is false, like when the repeat attribute is not received, which means a user only presses the key once and does not press the key a relatively long time that may result in repeated key events.

At present, the types of the channels obtained by the display apparatus are divided into various channel types, for example, the channel types may be divided into channels from a wired cable signal, a satellite signal and an antenna signal. For example, channel numbers corresponding to channels in the wired cable signal are 1-68, and thus a maximum length of its channel numbers is 2 bits, and the 1-68 channels can be seen as a first channel list. The maximum length of the channel numbers in the first channel list is 2 bits. Channel numbers corresponding to channels in the satellite signal are 1-237, and thus a maximum length of its channel numbers is 3 bits, and the 1-237 channels can be seen as a second channel list. The maximum length of the channel numbers in the second channel list is 3 bits. Therefore, the different channel types have the different maximum lengths of the channel numbers. Therefore, the display apparatus needs to obtain the maximum length of the channel numbers for each channel type. It is noted that the first and second channel list are used to distinguish different channel lists and can be used interchangeably like the first channel list can be 1-237 channels from the satellite signals.

The display apparatus obtains a channel number corresponding to a currently displayed channel, that is, obtains a first channel number corresponding to FIG. 2; obtains a channel type corresponding to the first channel number according to the first channel number, and obtains the maximum length of the channel number corresponding to the channel type, so that the length of the second channel number is compared with the maximum length of the channel numbers for the channel type where the second channel number belongs. For example, the maximum length of the channel number of a cable television is 2 bits, the maximum length of the channel number for a radio television is 3 bits, and if the user watches a channel corresponding to the cable television, the length of the second channel number is compared with 2 after the second channel number is obtained.

The display apparatus may traverse a channel list of each channel type when being started, and obtain and store the maximum length of the channel numbers corresponding to each channel type, so as to read the corresponding maximum length according to the channel type when the second channel number is obtained.

FIGS. 6A-6E illustrate a flow diagram of a channel control method in the display apparatus.

Figure 6A:
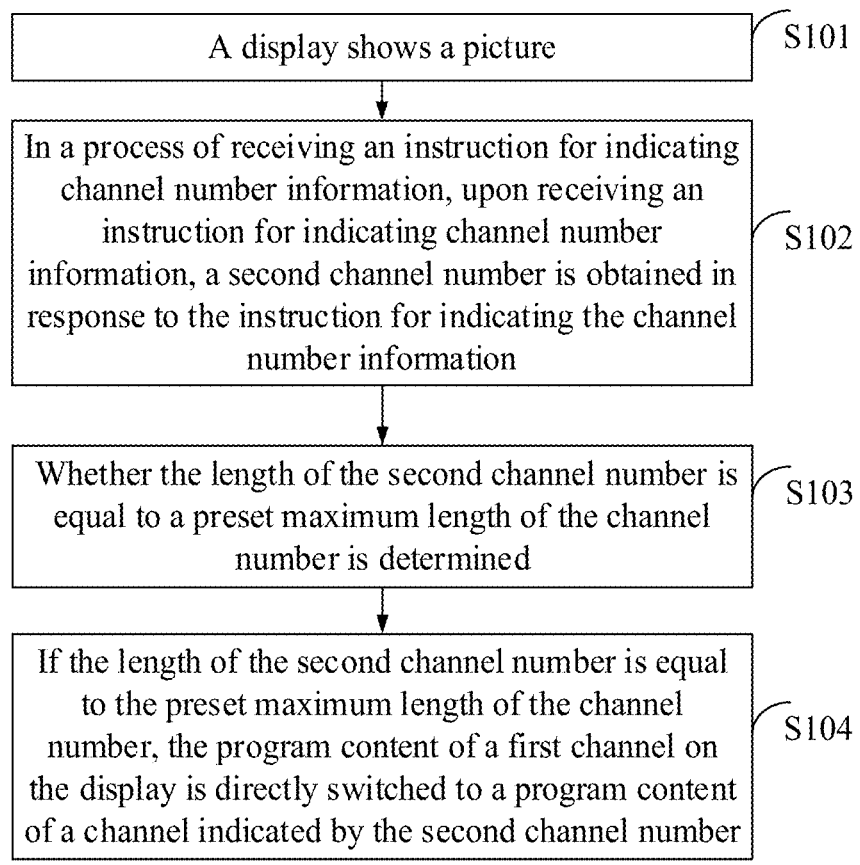
FIGS. 6A-6E illustrate flow diagrams of a channel control method in an embodiment of the disclosure.

FIG. 6A shows a channel control method when a display apparatus switches a channel. In combination with the method shown in FIG. 6A, the method includes the following steps S101-S104.

S101, a display shows a picture. For example, the display may show a video content corresponding to a picture shown in FIG. 2.

S102, in a process of receiving an instruction for indicating channel number information, upon receiving an instruction for indicating channel number information, a second channel number is obtained in response to the instruction for indicating the channel number information. For example, as for a picture as shown in FIG. 3A, when the user inputs a numeric digit "1", a second channel number 1 is shown on a top right corner of the played picture on the display, the user continues to input a numeric digit "2", the second channel number is updated, the obtained second channel number is 12, and the picture shown in FIG. 3A is updated to a picture shown in FIG. 3B.

S103, whether the length of the second channel number is equal to a preset maximum length of the channel number is determined.

S104, if the length of the second channel number is equal to the preset maximum length of the channel number, the program content of a first channel on the display is directly switched to a program content of a channel indicated by the second channel number. For example, the picture as shown in 3C.

In the present embodiments, when the user switches the channel during watching a live program and inputs channel number information that constructs a channel number to the display apparatus through a control device such as a remote control, in a process of the user inputting, the display apparatus obtains the second channel number according to an instruction for indicating the channel number information each time, determines whether the length of the second channel number is equal to the maximum length of the channel number of the display apparatus, and if so, directly switches the program content to a program content corresponding to a second channel without clicking "OK" button by the user or waiting for a period of time to switch, thereby facilitating user operation, and improving user's experience.

Figure 6B:
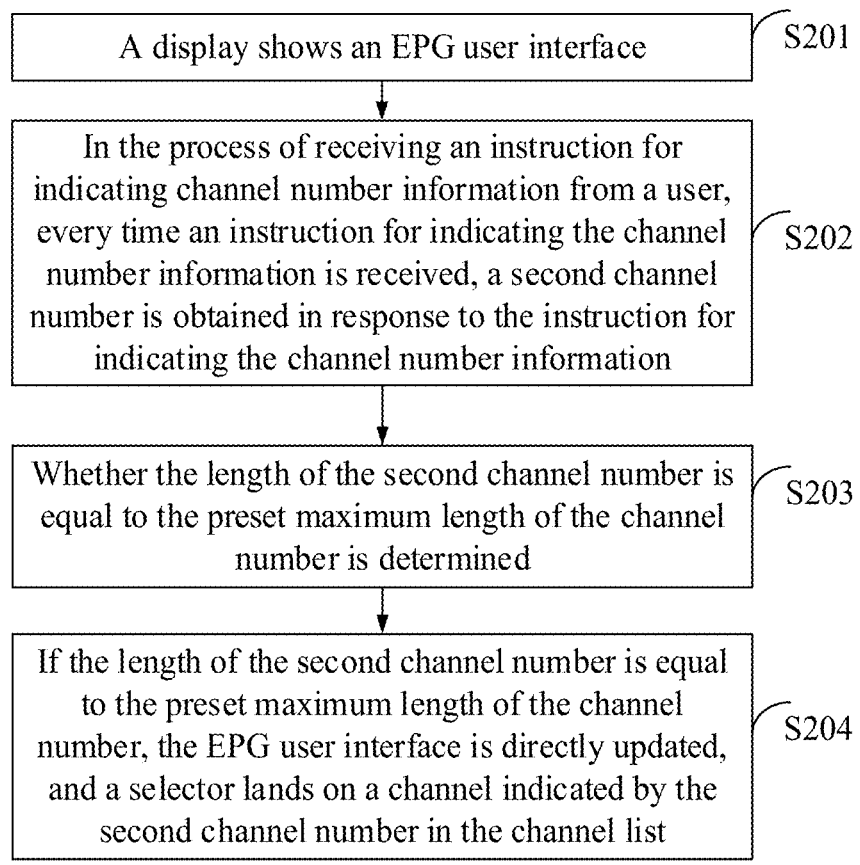

FIG. 6B shows a channel control method when the display apparatus locates a channel. Referring to the method shown in FIG. 6B, the method includes the following steps S201-S204.

S201, a display shows an EPG user interface. For example, the display may show a picture shown in FIG. 4A.

When the display plays a video content corresponding to the picture shown in FIG. 2, a user inputs an instruction for showing EPG to the display apparatus through a key for showing EPG on a remote control; and the display apparatus responds to the instruction, and shows the picture in FIG. 4A.

S202, in the process of receiving an instruction for indicating channel number information from a user, every time an instruction for indicating the channel number information is received, a second channel number is obtained in response to the instruction for indicating the channel number information. For example, as for a picture as shown in FIG. 4B, when the user inputs a numeric digit "1", a second channel number 1 is displayed on a top right corner of the played picture on the display, the user continues to input a numeric digit "2", the second channel number is updated, the obtained second channel number is 12, and the picture shown in FIG. 4B is updated to a picture shown in FIG. 4C.

S203, whether the length of the second channel number is equal to the preset maximum length of the channel number is determined. In some embodiments, the preset maximum length of the channel number is a maximum length of a channel type which the channel number belongs. For the channel type corresponding to the wired cable signal, the channel numbers are in the range of 1 to 68, and the maximum length of the channel number is 2 bits. In other words, different channel types may map to different channel lists. As discussed before, the preset maximum length of the channel number is the maximum length of the channel number in a first channel list.

S204, if the length of the second channel number is equal to the preset maximum length of the channel number, the EPG user interface is directly updated, and a selector lands on a channel indicated by the second channel number in the channel list. For example, the picture is shown in FIG. 4D.

Figure 6C:
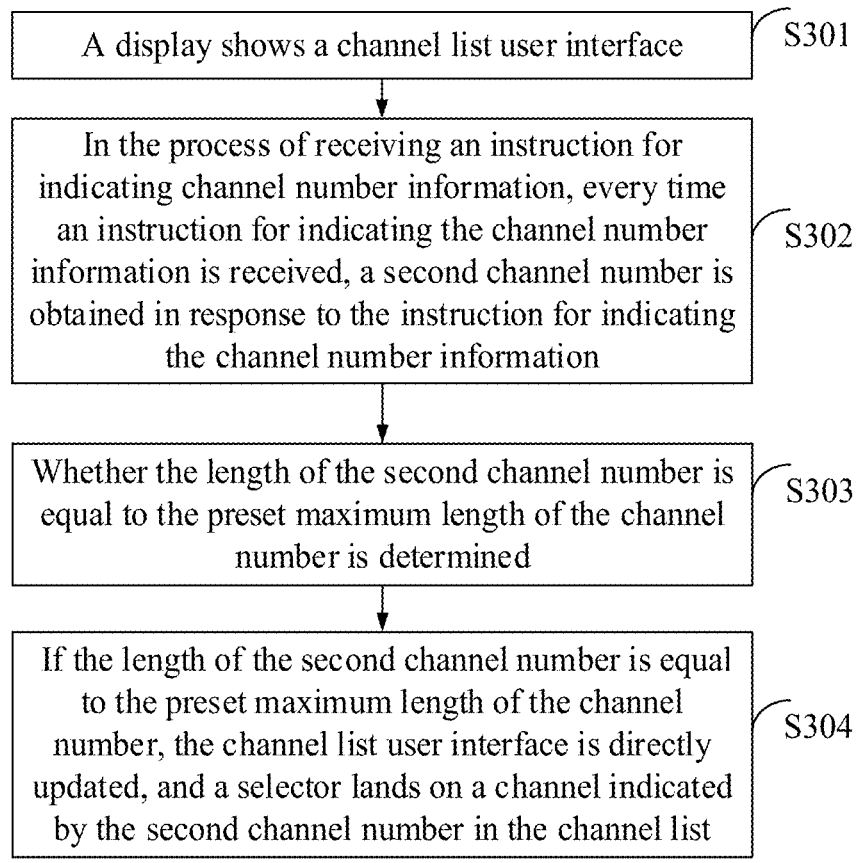
Figure 6D:
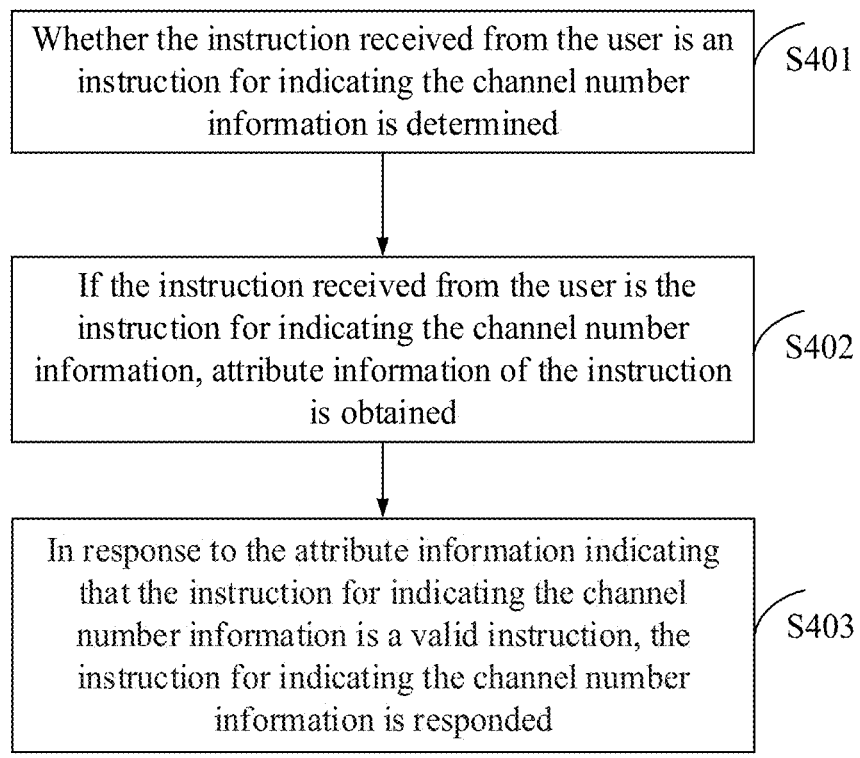

FIG. 6C shows a channel control method when the display apparatus locates a channel. Referring to the method shown in FIG. 6B, the method includes the following steps S301-S304.

S301, a display shows a channel list user interface. For example, the display may present a picture shown in FIG. 5A.

When the display plays a video content corresponding to the picture shown in FIG. 2, a user inputs an instruction for showing a channel list to the display apparatus through a key on a remote control like a shortcut key for showing a channel list; and the display apparatus responds to the instruction, and presents the picture as shown in FIG. 5A.

S302, in the process of receiving an instruction for indicating channel number information, every time an instruction for indicating the channel number information is received, a second channel number is obtained in response to the instruction for indicating the channel number information. For example, as for a picture as shown in FIG. 5B, when the user inputs a numeric digit "1", a second channel number 1 is displayed on a top right corner of the played picture on the display, the user continues to input a numeric digit "2", the second channel number is updated, the obtained second channel number is 12, and the picture shown in FIG. 5B is updated to a picture shown in FIG. 5C.

S303, whether the length of the second channel number is equal to the preset maximum length of the channel number is determined.

S304, if the length of the second channel number is equal to the preset maximum length of the channel number, the channel list user interface is directly updated, and a selector lands on a channel indicated by the second channel number in the channel list. For example, the picture is shown in FIG. 5D.

For the channel switching during broadcast in the display apparatus, the three modes for locating a channel on the EPG user interface and the channel list user interface are illustrated below by taking channel switching during broadcast as an example. Relevant description that the display apparatus locates a channel on the EPG user interface and the channel list user interface may refer to the description when the display apparatus switches a channel during broadcast.

Before S102, the display apparatus further determines whether the instruction for indicating the channel number information is a valid instruction. Specifically, referring to the method shown in FIG. 5D, the method includes the following steps S401-S404.

S401, whether the instruction received from the user is an instruction for indicating the channel number information is determined.

Specially, the instruction received by the display apparatus may be an instruction for indicating channel switching. For example, a channel that the user intends to switch is a channel corresponding to a channel number 1, after pressing a number key "1", the length of the second channel number 1 is smaller than a maximum length 2, and therefore, the display apparatus does not directly switch the channel. The user inputs an instruction for indicating channel switching through an "OK" key. Therefore, the display apparatus needs to determine whether the instruction is an instruction for indicating the channel number information after receiving the instruction input from the user.

S402, if the instruction received from the user is the instruction for indicating the channel number information, attribute information of the instruction is obtained, such as a repeat attribute. The attribute information associated with the instruction is configured to indicate whether the instruction for indicating the channel number information from is a valid instruction.

S403, in response to the attribute information indicating that the instruction for indicating the channel number information is a valid instruction, the instruction for indicating the channel number information is responded.

In the embodiments, when the user presses a number key, if the user presses one number key for a relatively long time, the display apparatus receives the instructions for indicating the channel number information continually in a short time, and the display apparatus determines whether the instruction for indicating the channel number information is valid based on the attribute information corresponding to an instruction.

When it is determined that the instruction for indicating the channel number information is valid, the instruction for indicating the channel number information is responded. Thus an accidental channel switching due to a relatively long time press on a button of the remote control is avoided and user experience is improved.

Figure 6E:
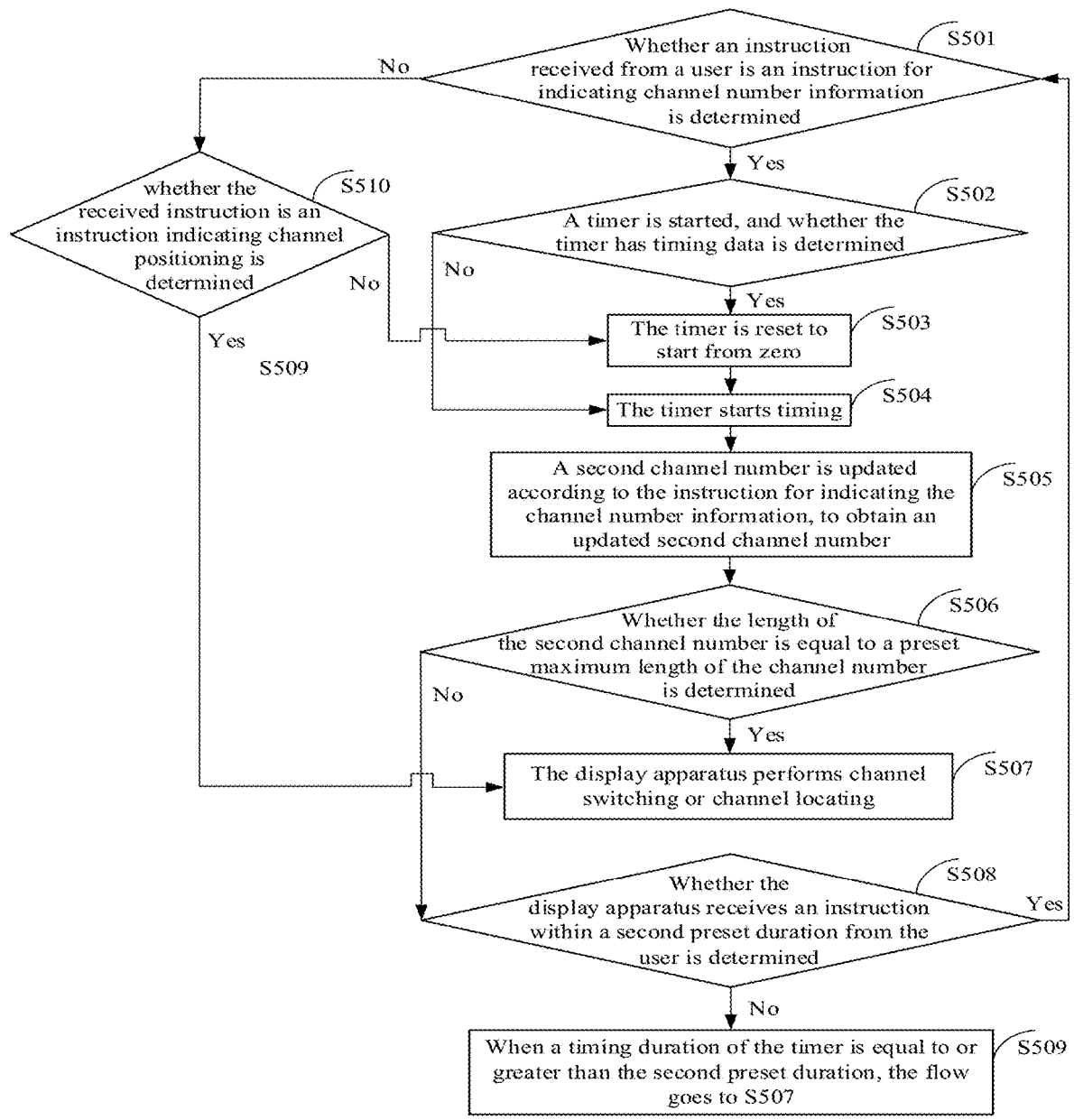

FIG. 6E shows a channel control method according to an embodiment of the disclosure. Referring to the method shown in FIG. 6E, the method includes the following steps S501-S504.

S501, whether an instruction received from a user is an instruction for indicating channel number information is determined, if so, the flow goes to S502; and if not, the flow goes to S510.

S502, a timer is started, and whether the timer has timing data is determined, if so, the flow goes to S503; and if not, the flow goes to S504.

S503, the timer is reset to start from zero.

Specifically, after the timer is reset, the flow goes to S504.

S504, the timer starts timing.

S505, a second channel number is updated according to the instruction for indicating the channel number information, to obtain an updated second channel number.

S506, whether the length of the second channel number is equal to a preset maximum length of the channel number is determined, if so, the flow goes to S507; and if not, the flow goes to S508.

S507, the display apparatus performs channel switching or channel locating.

It should be noted that if S509 is executed before executing S507, the display apparatus performs channel switching or channel locating according to the second channel number before updating; and if S506 or S509 is executed before executing S507, the display apparatus performs channel switching or channel locating according to the updated second channel number. For example, the second channel number before updating is 1, if the instruction received by the display apparatus is an instruction for indicating channel switching or an instruction for indicating channel locating, the display apparatus switches to or turns to a channel of the channel number 1. If the instruction received by the display apparatus is an instruction for indicating the channel number information, the display apparatus updates the second channel number 1 to obtain an updated channel number 12, the length of the second channel number 12 reaches the maximum length, and the display apparatus directly switches or turns the channel to the channel corresponding to the channel number 12.

S508, whether the display apparatus receives an instruction within a second preset duration from the user is determined, if so, the flow goes back to S501, and if not, the flow goes to S509.

S509, when a timing duration of the timer is equal to or greater than the second preset duration, the flow goes to S507.

Specifically, when the second channel number obtained by the display apparatus is 1, the length of the current channel number is smaller than a maximum length, and the user may continue to input an instruction for indicating the channel number information or an instruction for indicating channel switching. If the display apparatus receives the instruction within the second preset duration, the flow goes back to S501. If the display apparatus does not receive any instruction within the second preset duration, when the timing duration of the timer is equal to or greater than the second preset duration, S507 is executed.

S510, whether the received instruction is an instruction indicating channel positioning is determined, if so, S507 is executed; and if not, S503 is executed.

It should be noted that if it is determined to execute S503 according to S510, the flow ends after executing S503.

In the above embodiments, when the user switches the channel during watching a broadcasting program and inputs the channel number information that constructs the channel number to the display apparatus through a control device such as a remote control, in the inputting process from a user, the display apparatus obtains one second channel number according to the instruction for indicating the channel number information each time, whether the length of the second channel number is equal to the maximum length of the channel number of the display apparatus is determined, and if so, the program content is directly switched to the program content corresponding to a second channel without clicking a confirm key by the user or waiting for a period of time to switch, thereby facilitating user operation, and improving use experience for the user. Moreover, when the length of the channel number is equal to the maximum length, the display apparatus directly performs channel switching or channel positioning. The following problem that the length of the channel number input from the user is greater than the maximum length the apparatus currently can reach due to misoperation of the user, and therefore the channel cannot be switched or positioned properly, is avoided.

For the purpose of illustration and description, the aforementioned embodiments are provided not intended to limit the disclosure. All elements or features of the specific embodiments are usually not limited to the specific embodiment, and can also be used or interchanged in other embodiments where applicable even if not specifically shown or described.

What is claimed is:

1. A display apparatus, comprising:
a display;
a user input interface, configured to receive an instruction from a user; and
a controller, in communication with the display and the user input interface and configured to perform:
while a program content of a first channel in a first channel list is played on the display, in response to a digit of a channel number input from the user via a remote control device, presenting the channel number on an electronic program guide (EPG) interface on the display in real time, and presenting a selector for indicating a current channel on the first channel on the EPG interface, wherein the first channel list comprises a plurality of channels from a type of broadcasting signal, and the channel number comprises one or more digits input one-by-one via the remote control device; and
in response to a length of the current channel number after receiving the digit of the channel number input from the user being equal to a maximum length of the channel number in the first channel list within a first preset duration, switching the program content of the first channel to a program content of a second channel corresponding to the current channel number without a user's confirmation instruction via a button on the remote control device within the first preset duration, landing the selector on the second channel corresponding to the current channel number, and not responding to a digit of a channel number that the user continues to input within the first preset duration;

in response to a length of the current channel number after receiving the digit of the channel number input from the user being less than a maximum length of the channel number in the first channel list, updating the current channel number presented on the display in real time;

in response to a length of the current channel number after receiving the digit of the channel number input from the user being greater than a maximum length of the channel number in the first channel list, not responding to the digit recently received from the remote control device by not presenting the digit recently received from the remote control device on the display.

2. The display apparatus according to claim 1, wherein the type of broadcasting signal is one of: a wired cable signal, a satellite signal, or an antenna signal.

3. The display apparatus according to claim 1, wherein the maximum length of the channel number in the first channel list is obtained by calculating a maximum length of the channel number in the first channel list when the display apparatus is started.

4. The display apparatus according to claim 1, wherein the maximum length of the channel number in the first channel list is obtained by calculating a maximum length of the channel number in the first channel list when the display apparatus loads the first channel list.

5. The display apparatus according to claim 1, wherein the controller is further configured to perform:

while the one or more digits of the channel number are being received, in response to receiving a key event associated with a first number key and a repeat attribute of the key event from the remote control device, presenting one digit corresponding to the first number key on the display, wherein the repeat attribute is configured to indicate whether pressing of a number key is regarded as being pressed the number key repeatedly.

6. The display apparatus according to claim 1, wherein the first channel list is included in the EPG user interface.

7. The display apparatus according to claim 1, where the controller is further configured to perform:

in response to the digit of the channel number input from the user via the remote control device, starting a timer with a second preset duration;

in response to no digit input of the channel number being received within the second preset duration and the length of the current channel number being less than the maximum length, switching the program content of the first channel to a program content of the current channel number.

8. The display apparatus according to claim 7, where the controller is further configured to perform:

in response to another digit of the channel number being received within the second preset duration, resetting the timer with the second preset duration.

9. A channel control method for a display apparatus, comprising:

while a program content of a first channel in a first channel list is played on a display of the display apparatus, in response to a digit of a channel number input from a user via a remote control device of the display apparatus, presenting the channel number on an electronic program guide (EPG) interface on the display in real time, and presenting a selector for indicating a current channel on the first channel on the EPG interface, wherein the first channel list comprises a plurality of channels from a type of broadcasting signal, the channel number comprises one or more digits input one-by-one via the remote control device; and in response to a length of the current channel number after receiving the digit of the channel number input from the user being equal to a maximum length of the channel number in the first channel list within a first preset duration, switching the program content of the first channel to a program content of a second channel corresponding to the current channel number without a user's confirmation instruction via a button on the remote control device within the first preset duration, landing the selector on the second channel corresponding to the current channel number, and not responding to a digit of a channel number that the user continues to input within the first preset duration;

in response to a length of the current channel number after receiving the digit of the channel number input from the user being less than a maximum length of the channel number in the first channel list, updating the current channel number presented on the display in real time;

in response to a length of the current channel number after receiving the digit of the channel number input from the user being greater than a maximum length of the channel number in the first channel list, not responding to the digit recently received from the remote control device by not presenting the digit recently received from the remote control device on the display.

10. The method according to claim 9, wherein the type of broadcasting signal is one of: a wired cable signal, a satellite signal, or an antenna signal.

11. The method according to claim 9, wherein the maximum length of the channel number in the first channel list is obtained by calculating a maximum length of the channel number in the first channel list when the display apparatus is started.

12. The method according to claim 9, wherein the maximum length of the channel number in the first channel list is obtained by calculating a maximum length of the channel number in the first channel list when the display apparatus loads the first channel list.

13. The method according to claim 9, further comprising:

while the one or more digits of the channel number are being received, in response to receiving a key event associated with a first number key and a repeat attribute of the key event from the remote control device, presenting one digit corresponding to the first number key on the display, wherein the repeat attribute is configured to indicate whether pressing of a number key is regarded as being pressed the number key repeatedly.

14. The method according to claim 9, wherein the first channel list is included in the EPG user interface.

15. The method according to claim 9, further comprising:

in response to the digit of the channel number input from the user via the remote control device, starting a timer with a second preset duration;

in response to no digit input of the channel number being received within the second preset duration and the length of the current channel number being less than the maximum length, switching the program content of the first channel to a program content of the current channel number.

16. The method according to claim 15, further comprising:

in response to another digit of the channel number being received within the second preset duration, resetting the timer with the second preset duration.

* * * * *